United States Patent
Hong et al.

(10) Patent No.: US 10,720,047 B2
(45) Date of Patent: Jul. 21, 2020

(54) ELECTRONIC APPARATUS AND METHOD FOR CONTROLLING THE SAME

(71) Applicant: Samsung Electronics Co., Ltd., Suwon-si, Gyeonggi-do (KR)

(72) Inventors: Jin-hyuk Hong, Seoul (KR); Byung-seok Soh, Yongin-si (KR); Eun-seok Choi, Suwon-si (KR); Shin-a Kim, Seongnam-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/349,500

(22) Filed: Nov. 11, 2016

(65) Prior Publication Data
US 2017/0132913 A1    May 11, 2017

(30) Foreign Application Priority Data
Nov. 11, 2015    (KR) .................. 10-2015-0157999

(51) Int. Cl.
*G05B 11/01*    (2006.01)
*G08C 19/16*    (2006.01)
(Continued)

(52) U.S. Cl.
CPC .......... *G08C 23/04* (2013.01); *H04N 5/4403* (2013.01); *H04N 21/42204* (2013.01); *H04N 21/42208* (2013.01); *H04N 21/42225* (2013.01); *H04N 21/4312* (2013.01); *H04N 21/44222* (2013.01); *H04N 21/4436* (2013.01); *H04N 2005/4421* (2013.01); *H04N 2005/44556* (2013.01); *H04N 2005/44586* (2013.01)

(58) Field of Classification Search
CPC ..................... G08C 23/04; H04N 21/42204
See application file for complete search history.

(56) References Cited

U.S. PATENT DOCUMENTS 5,949,351 A * 9/1999 Hahm .................... G08C 23/04
                                                              340/12.55
6,411,337 B2 * 6/2002 Cove .................. H04N 5/44513
                                                              348/563
(Continued)

FOREIGN PATENT DOCUMENTS

CN    1661662    8/2005
CN    101521729    9/2009
(Continued)

OTHER PUBLICATIONS

A2DP Bluetooth Audio Rrandomly Shows _(No Media)_—Android Enthusiasts Stack Exchange (Year: 2015).*
(Continued)

*Primary Examiner* — Quang Pham
(74) *Attorney, Agent, or Firm* — Staas & Halsey LLP

(57) ABSTRACT

An electronic apparatus and a method for controlling the same are provided. More particularly, an electronic apparatus controlled by a first remote controller for a first electronic apparatus, and a method for controlling the same are provided. The y embodiments provide an electronic apparatus controlled by a selection of one button positioned in a first remote controller for a first electronic apparatus, and a method for controlling the same.

20 Claims, 14 Drawing Sheets

(51) Int. Cl.
*G08C 23/04* (2006.01)
*H04N 21/422* (2011.01)
*H04N 21/431* (2011.01)
*H04N 21/442* (2011.01)
*H04N 5/44* (2011.01)
*H04N 21/443* (2011.01)
*H04N 5/445* (2011.01)

(56) References Cited

U.S. PATENT DOCUMENTS

| | | | |
|---|---|---|---|
| 7,225,456 B2* | 5/2007 | Kitsukawa | H04N 7/088 348/E5.002 |
| 7,397,514 B2 | 7/2008 | Hsieh | |
| 8,031,270 B1 | 10/2011 | Wisniewski et al. | |
| 8,508,482 B2 | 8/2013 | Van der Byl | |
| 8,648,970 B2* | 2/2014 | Lee | H04N 5/4403 345/156 |
| 8,650,505 B2 | 2/2014 | Anttila | G06F 3/0482 715/818 |
| 8,704,698 B2* | 4/2014 | Park | G08C 17/00 341/176 |
| 8,754,992 B1* | 6/2014 | Schulze | H04N 21/42226 340/12.22 |
| 9,307,294 B2* | 4/2016 | Hiyoshi | G06F 3/04815 |
| 2001/0017616 A1* | 8/2001 | Kobayashi | H04N 5/44582 345/173 |
| 2002/0021373 A1 | 2/2002 | Shibamiya | |
| 2003/0067484 A1* | 4/2003 | Moir | G06F 16/957 715/747 |
| 2004/0120716 A1 | 6/2004 | Gustafson et al. | |
| 2005/0005288 A1* | 1/2005 | Novak | H04N 5/4403 725/32 |
| 2005/0017949 A1 | 1/2005 | Dunn et al. | |
| 2005/0172020 A1* | 8/2005 | Koga | H04L 12/2803 709/223 |
| 2005/0185096 A1 | 8/2005 | Hsieh | |
| 2005/0192051 A1* | 9/2005 | Tokuhashi | H04M 1/72533 455/556.1 |
| 2006/0181429 A1 | 8/2006 | Garrison | |
| 2006/0279541 A1* | 12/2006 | Kim | G06F 3/0482 345/158 |
| 2006/0287851 A1 | 12/2006 | Kida et al. | |
| 2007/0139214 A1* | 6/2007 | Andersen | G08C 17/02 340/12.29 |
| 2007/0171091 A1* | 7/2007 | Nisenboim | G08C 17/00 340/12.24 |
| 2007/0176820 A1* | 8/2007 | Vidal | G08C 17/02 341/176 |
| 2008/0186176 A1* | 8/2008 | Hardacker | G08B 21/24 340/572.1 |
| 2009/0037971 A1* | 2/2009 | Lim | H04N 5/4403 725/131 |
| 2009/0083665 A1 | 3/2009 | Anttila et al. | |
| 2009/0213278 A1* | 8/2009 | Tsurumoto | H04N 5/4403 348/734 |
| 2009/0219174 A1* | 9/2009 | Kikuchi | H04N 5/76 341/20 |
| 2009/0219452 A1* | 9/2009 | Morikawa | H04N 5/44513 348/734 |
| 2010/0033549 A1* | 2/2010 | Sato | G06F 3/0346 348/14.08 |
| 2010/0053467 A1 | 3/2010 | Maxson | |
| 2010/0141851 A1* | 6/2010 | Kendall | G06F 3/0231 348/734 |
| 2010/0175022 A1* | 7/2010 | Diehl | G06F 3/0481 715/784 |
| 2010/0207778 A1* | 8/2010 | Haughawout | H04N 21/42225 340/12.28 |
| 2010/0208147 A1* | 8/2010 | Kimura | G08C 19/28 348/734 |
| 2011/0084867 A1* | 4/2011 | Friedlander | H04N 21/42207 341/176 |
| 2011/0090085 A1* | 4/2011 | Belz | G08B 21/0423 340/573.1 |
| 2011/0298581 A1* | 12/2011 | Hsu | H04N 21/42208 340/4.3 |
| 2012/0062468 A1* | 3/2012 | Chen | G08C 17/02 345/173 |
| 2012/0139847 A1* | 6/2012 | Hunt | G06F 3/0346 345/173 |
| 2012/0173979 A1* | 7/2012 | Lee | G06F 9/452 715/719 |
| 2012/0199643 A1* | 8/2012 | Minnick | H04N 21/4126 235/375 |
| 2012/0274863 A1* | 11/2012 | Chardon | G06F 3/04886 348/734 |
| 2013/0088332 A1* | 4/2013 | Park | H04N 21/4126 340/10.1 |
| 2013/0104082 A1* | 4/2013 | Burge | G06F 3/0482 715/841 |
| 2013/0169867 A1* | 7/2013 | Suginaka | H04N 5/4403 348/468 |
| 2013/0258207 A1* | 10/2013 | Kim | G08C 17/02 348/734 |
| 2013/0271659 A1* | 10/2013 | Na | H04N 5/4403 348/563 |
| 2014/0035736 A1* | 2/2014 | Weddle | A63H 30/04 340/407.2 |
| 2015/0103249 A1* | 4/2015 | Jung | H04N 21/42206 348/563 |
| 2015/0131008 A1 | 5/2015 | Robinson | |
| 2015/0179061 A1 | 6/2015 | Kim et al. | |
| 2015/0193121 A1* | 7/2015 | Fisher | H04N 21/6581 715/738 |
| 2016/0105627 A1* | 4/2016 | Streuter | H04N 21/4221 348/734 |
| 2016/0127675 A1* | 5/2016 | Ahn | H04N 5/4403 348/734 |
| 2016/0142662 A1* | 5/2016 | Lee | G06F 3/0482 348/734 |
| 2017/0366778 A1* | 12/2017 | Kim | G08C 17/02 |
| 2018/0012485 A1* | 1/2018 | Park | G08C 23/04 |
| 2018/0040239 A1* | 2/2018 | Hur | G08C 23/04 |

FOREIGN PATENT DOCUMENTS

| | | |
|---|---|---|
| CN | 101622593 | 1/2010 |
| CN | 102447854 | 5/2012 |
| CN | 102833499 | 12/2012 |
| CN | 102984478 | 3/2013 |
| EP | 2 651 144 A1 | 10/2013 |
| EP | 2 892 039 A1 | 7/2015 |
| KR | 10-2006-0042524 | 5/2006 |
| KR | 10-2013-0017897 | 2/2013 |
| KR | 10-2014-0122428 | 10/2014 |
| KR | 10-2015-0015299 | 2/2015 |

OTHER PUBLICATIONS

International Search Report and Written Opinion of the International Searching Authority dated Feb. 10, 2017 in International Patent Application No. PCT/KR2016/012570.

Extended European Search Report dated Apr. 16, 2018, in corresponding European Patent Application No. 16864509.1, 11 pgs.

European Patent Office issued Communication pursuant to Article 94(3) EPC in European Patent Application No. 16864509.1 dated Nov. 30, 2018 (6 pages).

Chinese Office Action dated May 25, 2020 in Chinese Patent Application No. 201680066157.1.

* cited by examiner

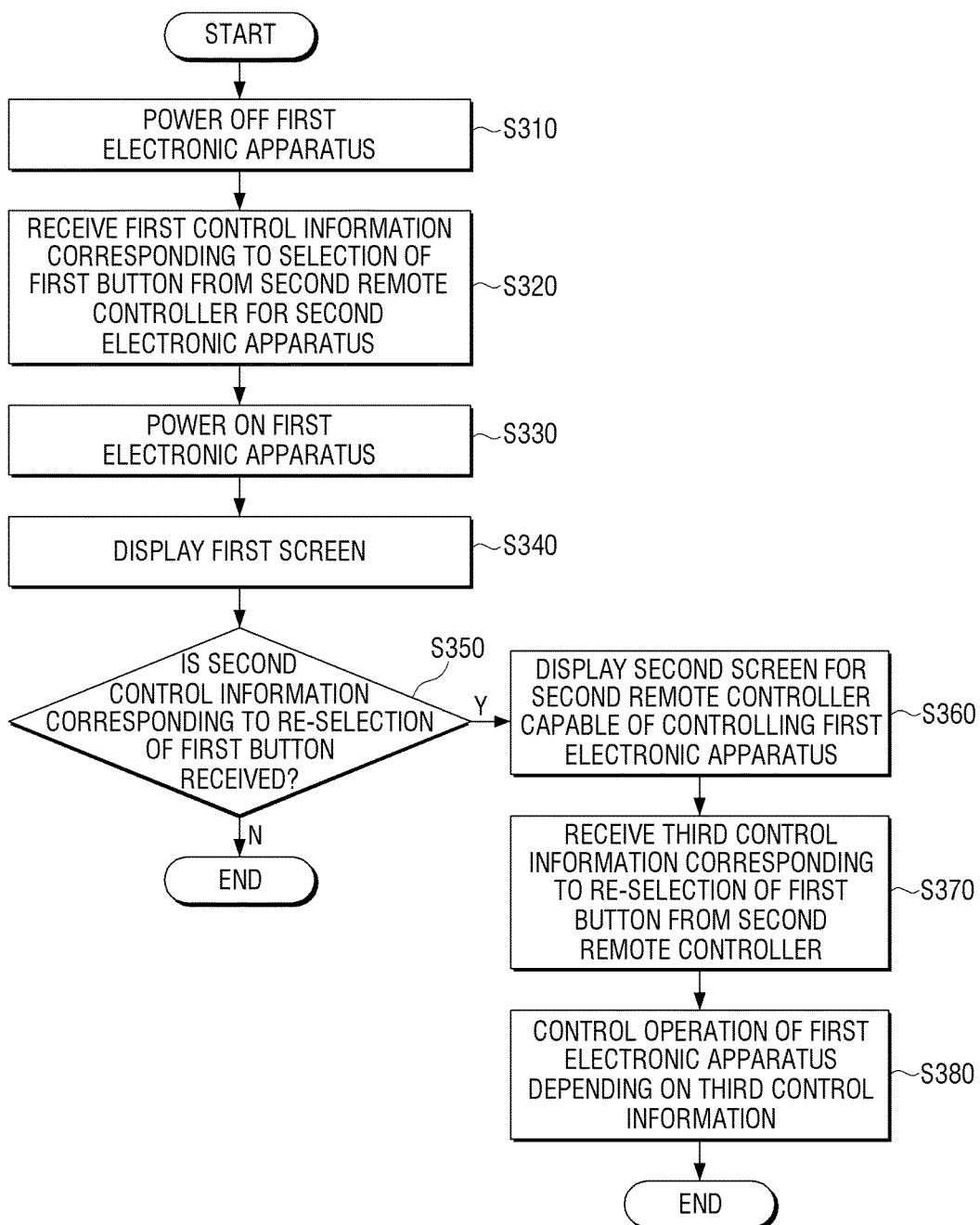

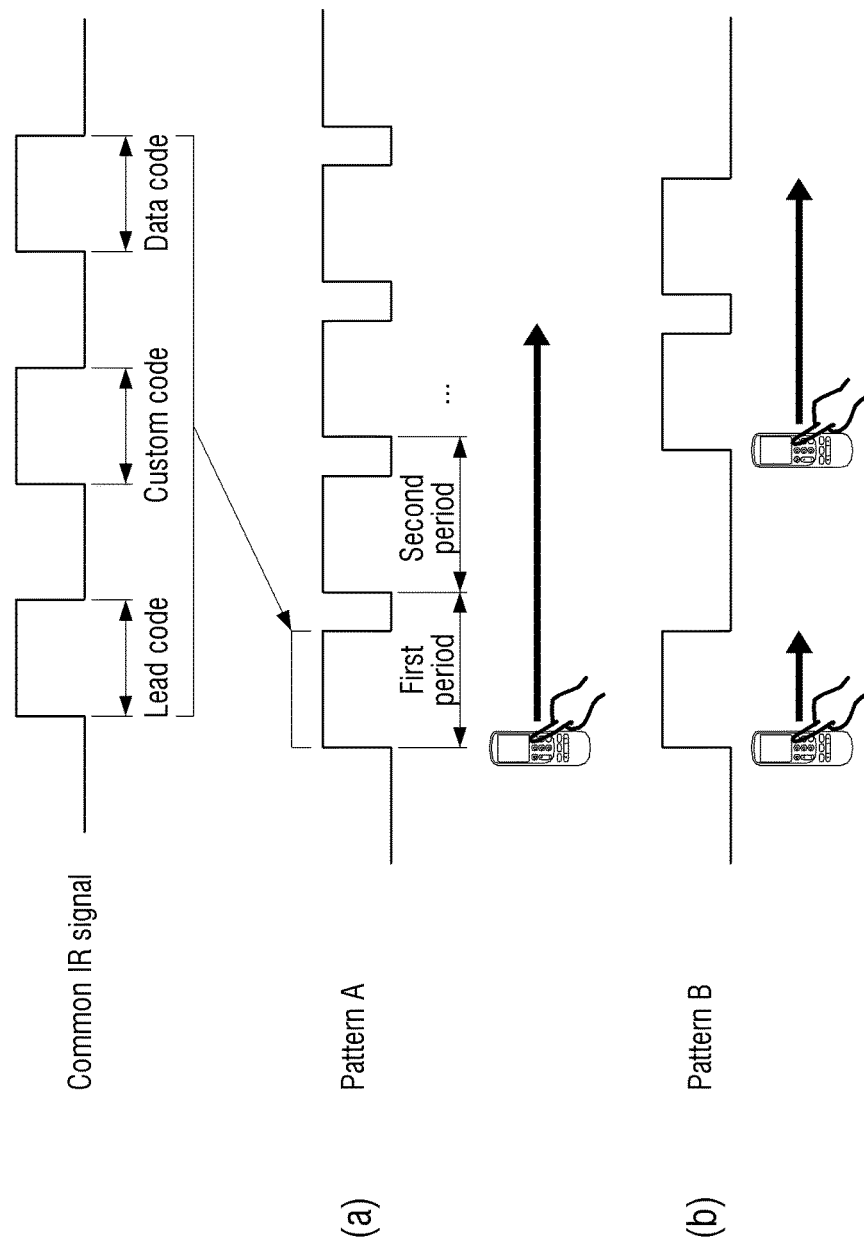

ELECTRONIC APPARATUS AND METHOD FOR CONTROLLING THE SAME

CROSS-REFERENCE TO RELATED APPLICATIONS

This application claims priority from Korean Patent Application No. 10-2015-0157999, filed on Nov. 11, 2015, in the Korean Intellectual Property Office, the disclosure of which is incorporated herein by reference in its entirety.

BACKGROUND

1. Field

Apparatuses and methods consistent with exemplary embodiments relate to an electronic apparatus and a method for controlling the same, and more particularly, to an electronic apparatus controlled by control information received from a remote controller for another electronic apparatus, and a method for controlling the same.

2. Description of the Related Art

As an interface method between an electronic apparatus (for example, a display apparatus) and a user, a remote controller or a panel key of the electronic apparatus is mainly used. In accordance with the development of technology, the electronic apparatus provides various functions to users.

In the case in which the user intends to control functions and operations of various electronic apparatuses, it may be inconvenient to remotely control the electronic apparatuses using a dedicated remote controller having a small size and a small number of buttons. In the case in which the dedicated remote controller is lost (for example, temporarily lost) or malfunctions, the user should manually directly control (or contact and control) the electronic apparatuses supporting various functions using panel keys of the electronic apparatuses.

SUMMARY

Additional aspects and/or advantages will be set forth in part in the description which follows and, in part, will be apparent from the description, or may be learned by practice of the invention.

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present disclosure, an electronic apparatus includes: a display; a light receiver receiving control information from a remote controller remotely controlling another electronic apparatus; and a controller controlling the display and the light receiver, wherein the controller controls a power supplier to supply power to the display depending on first control information to control the display to display a first screen, and controls the display to display a second screen including a plurality of control items for controlling the electronic apparatus on the display depending on second control information received from the remote controller.

The controller may control an operation of the electronic apparatus depending on selected one control item in the second screen in response to third control information corresponding to a selection of one of the plurality of control items received from the remote controller.

The first control information, the second control information, and the third control information may be signals each transmitted by a selection of the same button positioned in the remote controller and having the same waveform.

According to another aspect of the present disclosure, a method for controlling an electronic apparatus includes: supplying power to a display and displaying a first screen, depending on first control information received through a light receiver of the electronic apparatus from a remote controller controlling another electronic apparatus; displaying a second screen including a plurality of control items depending on second control information received from the remote controller; displaying selected one control item in the second screen depending on third control information received from the remote controller depending on a selection of one of the plurality of control items; and executing an operation of the electronic apparatus so as to correspond to the selected one control item in the second screen depending on fourth control information received from the remote controller.

According to still another aspect of the present disclosure, an electronic apparatus includes: a display; a light receiver receiving control information from a remote controller remotely controlling another electronic apparatus using light; and a controller controlling the display and the light receiver, wherein the light receiver receives first control information supplying power to the display to allow a first screen to be displayed by the controller and receives second control information allowing a second screen including a plurality of control items for controlling the electronic apparatus to be displayed on the display by the controller, and the first control information and the second control information are signals transmitted by a selection of the same button positioned in the remote controller and having the same waveform.

The light receiver may receive third control information allowing one of the plurality of control items to be selected by the controller and receive fourth control information allowing an operation of the electronic apparatus to be executed depending on the selected one control item by the controller, and the fourth control information is control information corresponding to a short press of the same button in the remote controller unlike the third control information.

According to yet still another aspect of the present disclosure, an electronic apparatus includes: a display; a storage storing first control information of a dedicated first remote controller remotely controlling the electronic apparatus therein; a light receiver receiving second control information from a second remote controller remotely controlling another electronic apparatus; and a controller controlling the display, the storage, and the light receiver, wherein in the case in which the second control information different from the stored first control information is continuously received from the second remote controller through the light receiver for a set time or more, the controller controls the electronic apparatus to be operated depending on the second control information.

The second control information may include a plurality of pieces of information, and some of the plurality of pieces of information may be signals each transmitted by a selection of the same button positioned in the second remote controller and having the same waveform.

The electronic apparatus controlled by a remote controller of another electronic apparatus that is not a dedicated remote controller controlling the electronic apparatus, and the method for controlling the same may be provided.

The electronic apparatus controlled by the remote controller of another electronic apparatus in the case in which the dedicated remote controller controlling the electronic apparatus is lost or malfunctions, and the method for controlling the same may be provided.

The electronic apparatus controlled by one of a plurality of buttons of the remote controller of another electronic apparatus that is not the dedicated remote controller controlling the electronic apparatus, and the method for controlling the same may be provided.

The electronic apparatus capable of identifying an unintended control by one of the plurality of buttons of the remote controller of another electronic apparatus that is not the dedicated remote controller controlling the electronic apparatus, and the method for controlling the same may be provided.

According to another aspect of the present disclosure, a non-transitory computer readable storage medium storing a method for controlling an electronic apparatus where the method includes: supplying power to a display and displaying a first screen, depending on first control information received through a light receiver of the electronic apparatus from a remote controller controlling another electronic apparatus; displaying a second screen including a plurality of control items depending on second control information received from the remote controller; displaying a selected control item on the second screen depending on third control information received from the remote controller depending on a selection of one of the plurality of control items; and executing an operation of the electronic apparatus corresponding to the selected control item in the second screen depending on fourth control information received from the remote controller.

According to another aspect of the present disclosure, a method of controlling a display includes: sequentially receiving plural control information from a remote control based on a sequential press of a same button of the remote control; and sequentially, responsive to the receiving of the plural control information, supplying power to the display to display a first screen, displaying a second screen including control items, selecting a control item of the control items and executing an operation corresponding to the control item.

The operation may be performed on another apparatus.

According to another aspect of the present disclosure, a non-transitory computer readable storage medium storing a method for controlling an electronic apparatus where the method includes: sequentially receiving plural control information from a remote control based on a sequential press of a same button of the remote control; and sequentially, responsive to the receiving of the plural control information, supplying power to the display to display a first screen, displaying a second screen including control items, selecting a control item of the control items and executing an operation corresponding to the control item According to another aspect of the present disclosure, an electronic apparatus includes: a display; a light receiver receiving remote control information from a remote control remotely controlling the electronic apparatus; and an apparatus controller controlling the display and the light receiver, the controller sequentially receiving, via the light receiver, plural control information from the remote control based on a sequential press of a same button of the remote control, and sequentially, responsive to the receiving of the plural control information, supplying power to the display to display a first screen, displaying a second screen including control items, selecting a control item of the control items and executing an operation corresponding to the control item.

Another remote controller is allowed to send the remote control information to the apparatus.

According to another aspect of the present disclosure, a remote control includes: a transmitter; and a button, where the transmitter transmits plural control information to an electronic apparatus having a display and a receiver receives remote control information from the transmitter to control the electronic apparatus, the transmitter sequentially transmitting the plural control information based on a plural sequential press of the button of the remote control to sequentially initiate, in the electronic apparatus, supplying power to the display to display a first screen, displaying a second screen including control items, selecting a control item of the control items, and executing an operation corresponding to the control item.

The transmitter of remote control includes one of a light transmitter and a radio wave transmitter and the receiver includes one of a light receiver and a radio wave receiver.

Another remote control is allowed to sequentially transmit the control information to sequentially initiate the supplying, the displaying, the selecting, and the executing.

The operation may be performed on another apparatus.

The supplying, displaying, and selecting correspond to a first length button press and the executing corresponds to a second length button press different from the first length button press. However, the present disclosure is not limited thereto. According to various exemplary embodiments of the present disclosure, the electronic apparatus controlled by the remote controller of another electronic apparatus that is not the dedicated remote controller controlling the electronic apparatus, and the method for controlling the same may be provided.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a schematic flow chart illustrating a method for controlling an electronic apparatus according to an exemplary embodiment of the present disclosure;

FIG. 5 is a schematic view illustrating an example of a remote control data format according to an exemplary embodiment of the present disclosure;

DETAILED DESCRIPTION

Figure 1:
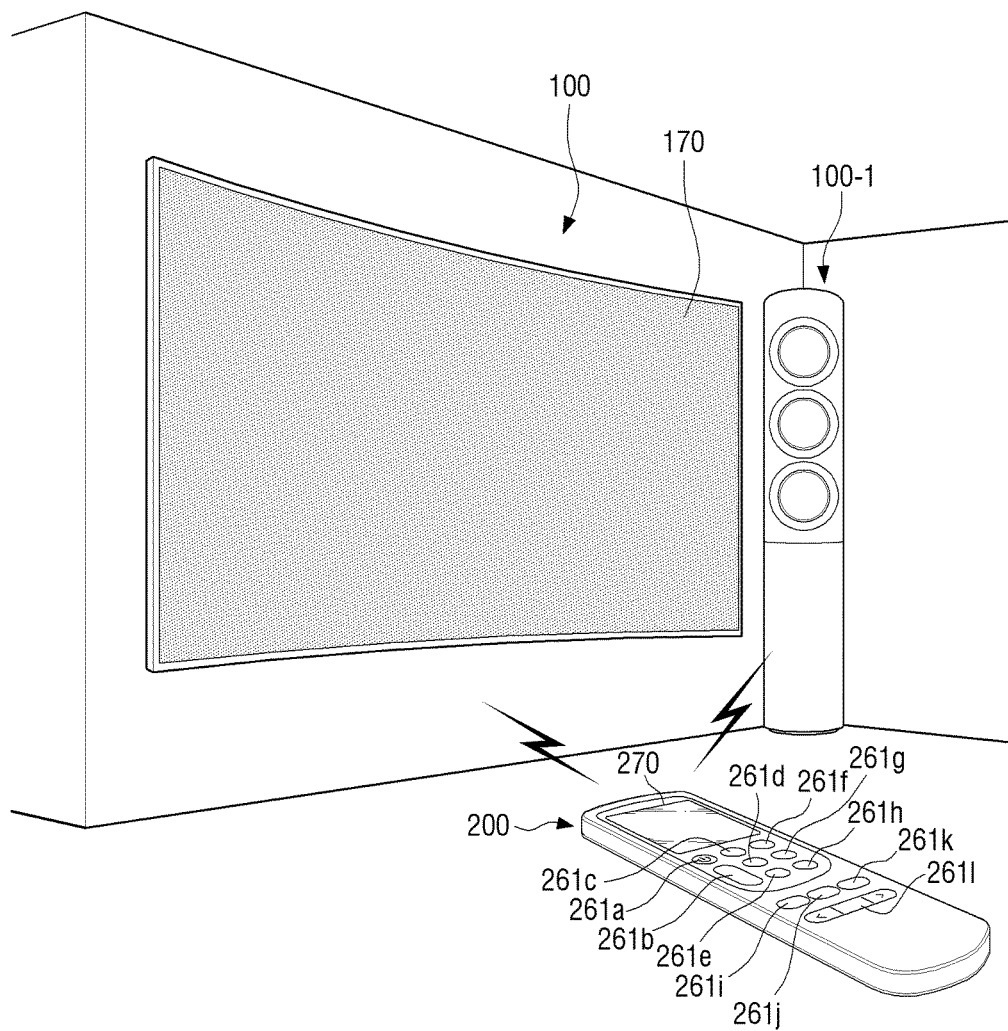
FIG. 1 is a schematic view illustrating an operation between a remote controller and an electronic apparatus according to an exemplary embodiment of the present disclosure.

Reference will now be made in detail to the embodiments, examples of which are illustrated in the accompanying drawings, wherein like reference numerals refer to the like elements throughout. The embodiments are described below by referring to the figures.

Hereinafter, exemplary embodiments of the present disclosure will be described in detail with reference to contents mentioned in the accompanying drawings. In addition, a method for manufacturing and using an electronic apparatus according to an exemplary embodiment of the present disclosure will be described in detail with reference to contents mentioned in the accompanying drawings. Throughout the accompanying drawings, like reference numerals denote parts or components performing substantially the same functions.

Terms including ordinal numbers such as 'first', 'second', and the like, may be used to describe various components. However, these components are not limited by these terms. The terms are used only to distinguish one component from another component. For example, a 'first' component may be named a 'second' component and the 'second' component may also be similarly named the 'first' component, without departing from the scope of the present disclosure. A term 'and/or' includes a combination of a plurality of related items or any one of the plurality of related items.

In an exemplary embodiment of the present disclosure, 'selection of button (or key) present in a remote controller may be used as a phrase meaning a press of a button (or a key) or a touch of the button (or the key).

'User input' may be used as a phrase including, for example, a selection (for example, a long press or a short press) of a button (or a key) of a user, a press (for example, a long press or a short press) of the button (or the key) of the user, a touch (for example, a long press or a short press) of the button of the user, a touch gesture of the user, a speech of the user, a motion of the user. In addition, a touch (including a touch gesture) in a second remote controller 200 may be input by a body of the user or an input pen (for example, a stylus (not illustrated)).

In an exemplary embodiment of the present disclosure, an electronic apparatus may include an apparatus that may be purchased by business to business (B2B) transaction or an apparatus that may be purchased by business to customer (B2C) transaction. The electronic apparatus may be positioned in, for example, an office, a home, a factory, or an exhibit space.

The electronic apparatus may be controlled by control information output uni-directionally from a remote controller. In an exemplary embodiment of the present disclosure, the electronic apparatus may be controlled by uni-directionally output control information. The electronic apparatus may be controlled by control information received from a light output of the remote controller. The electronic apparatus may be controlled by control information (for example, an infrared (IR) pulse) output through the light (for example, infrared (IR)) output of the remote controller. The output IR pulse may have a frequency range of several tens to several hundreds kHz.

The control information received from the remote controller may be used as a meaning including a control signal (for example, an IR pulse). The control signal may be output in a binary code form through the light output of the remote controller.

Generally, a first electronic apparatus (for example, a display apparatus) may be controlled by a first remote controller dedicated to the first control apparatus. A second electronic apparatus (for example, an air conditioner) may be controlled by a second remote controller dedicated to the second control apparatus.

In an exemplary embodiment of the present disclosure, the first electronic apparatus (for example, the display apparatus) may be controlled by the second electronic apparatus (for example, the air conditioner). The first electronic apparatus (for example, the display apparatus) may be controlled by control information received from the second electronic apparatus (for example, the air conditioner).

In an exemplary embodiment of the present disclosure, 'screen of electronic apparatus' may be used as a term meaning an image, a user interface (UI), or a frame displayed on a display of the electronic apparatus, but is not necessarily limited thereto. In some situations, the screen of the electronic apparatus may also be understood as meaning the display itself or a component including the display.

In an exemplary embodiment of the present disclosure, loss of the remote controller may be temporal (for example, several seconds, several minutes, several hours, several days, or the like) or permanent.

Terms used in the present specification are used to describe exemplary embodiments, and are not intended to restrict and/or limit the present disclosure. Singular forms are intended to include plural forms unless the context clearly indicates otherwise. It will be understood that terms 'include' or 'have' used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Throughout the accompanying drawings, like reference numerals denote members performing substantially the same functions.

FIG. 1 is a schematic view illustrating an operation between a remote controller and an electronic apparatus according to an exemplary embodiment of the present disclosure.

Referring to FIG. 1, a first electronic apparatus 100, a second electronic apparatus 100-1, and a second remote controller 200 are illustrated. Although the second remote controller 200 is illustrated in FIG. 1, the respective remote controllers corresponding to the respective electronic apparatuses may be used in an environment in which two or more electronic apparatuses are used.

In an exemplary embodiment of the present disclosure, the second remote controller 200 is used as a term meaning a remote controller dedicated to the second electronic apparatus 100-1, and a first remote controller (not illustrated) is used as a term meaning a remote controller dedicated to the first electronic apparatus 100.

In FIG. 1, for convenience of explanation, the respective electronic apparatuses and the remote controllers are distinguished from each other by adding ordinal numbers such as first and second. In addition, the first electronic apparatus 100 may be called an electronic apparatus, and the second electronic apparatus 100-1, a third electronic apparatus (not illustrated), or other electronic apparatus may be called another electronic apparatus. The second remote controller 200 may be called a separate (or dedicated) remote controller for controlling another electronic apparatus.

An electronic apparatus may mean an apparatus remotely controlled by the remote controller. In the case in which the first electronic apparatus 100 is a television apparatus, another electronic apparatus may be an air conditioner. In the case in which the first electronic apparatus 100 is an audio apparatus, another electronic apparatus may also be a television.

A first remote controller 200a (see FIG. 4A) transmits a control command in an infrared scheme to control the first electronic apparatus 100. The second remote controller 200 may transmit a control command in an infrared scheme to control the second electronic apparatus (for example, the audio apparatus) 100-1.

The remote controller may have different remote control data formats depending on manufacturers and/or electronic apparatuses (for example, a display apparatus, home appliances, a set-top box, audio apparatus, or the like). The remote control data formats may be different from each other depending on manufacturers and/or kinds of electronic apparatuses.

A user may damage or lose the first remote controller 200a dedicatedly controlling the first electronic apparatus 100 in his/her daily life. In an exemplary embodiment of the present disclosure, the user may transmit a control command using the second remote controller 200 to control the first electronic apparatus 100. A detailed description for a control of the first electronic apparatus using the second remote controller 200 will be provided below.

The first remote controller 200a may transmit the control command in the infrared scheme, but is not limited thereto. For example, the first remote controller 200a may transmit a control command through short range communication including Bluetooth to control the first electronic apparatus 100.

In an exemplary embodiment of the present disclosure, the user may control a function (for example, power on/off, channel change, volume adjustment, content reproduction, or the like) of the first electronic apparatus (for example, the display apparatus) 100 in which a display 170 is turned off, using the second remote controller 200. It will be understood by those skilled in the art that the first electronic apparatus 100 is, for example, a display apparatus, but is not limited thereto.

Referring to FIG. 1, the second remote controller 200 includes one or two or more buttons (or keys) 261a to 261l corresponding to functions of the second electronic apparatus 100-1. The one or two or more buttons 261a to 261l may include physical buttons or touch buttons. In an exemplary embodiment of the present disclosure, the second remote controller 200 may include buttons (for example, 261a to 261l) capable of controlling functions executed in the first electronic apparatus 100 instead of the first remote controller 200a. Alternatively, the second remote controller 200 may also include a multi-function button (not illustrated) corresponding to a multi-function.

The second remote controller 200 may further include a display 270.

A single function button (for example, a power button 261a) in the second remote controller 200 may be used as a term indicating a key corresponding to a control of one of various functions executed in the second electronic apparatus 100-1.

A multi-function key (for example, a color key (not illustrated)) of the second remote controller 200 may be used as a term indicating a key corresponding to a control of an additional function differently provided (or set) depending on a function executed in the first electronic apparatus 100.

The user may control the first electronic apparatus 100 using a first button (for example, 261f), which is one of a plurality of buttons of the second remote controller 200. The user may control the first electronic apparatus 100 using a selection of the first button 261f of the second remote controller 200. For example, a selection of the first button 261f may include a long press and a short press of the first button 261f.

Figure 2:
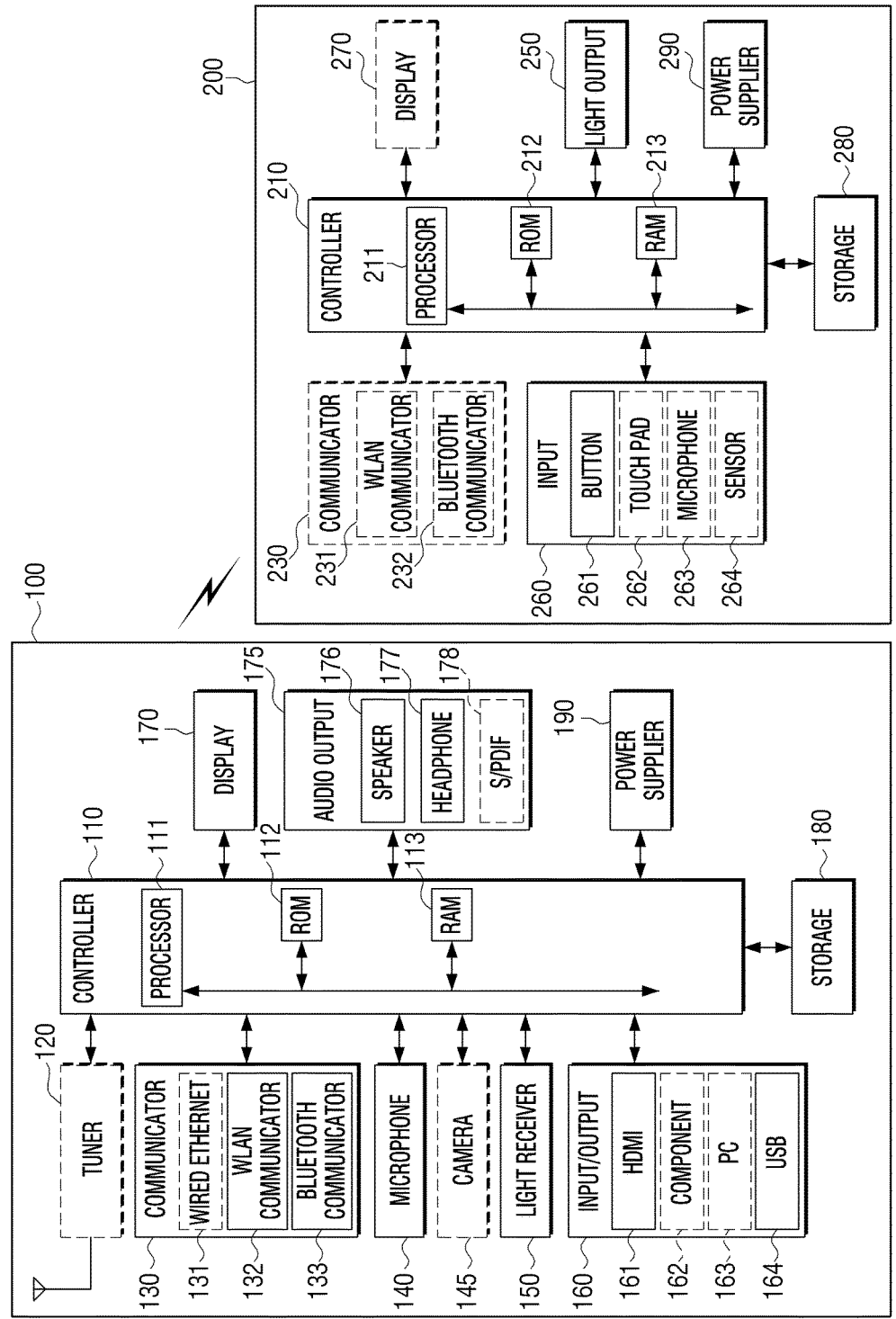
FIG. 2 is a block diagram illustrating the remote controller and the electronic apparatus according to an exemplary embodiment of the present disclosure.

FIG. 2 is a block diagram illustrating the remote controller and the electronic apparatus according to an exemplary embodiment of the present disclosure.

Referring to FIG. 2, the first electronic apparatus 100 receiving the control information from the second remote controller 200 may be connected to an external electronic apparatus (not illustrated) in a wired or wireless scheme using a communicator 130 or an input/output 160. The external electronic apparatus may include a cellular phone (not illustrated), a smartphone (not illustrated), a tablet personal computer (PC) (not illustrated), and a server (not illustrated).

The first electronic apparatus 100 may include a display 170, and further include one of a tuner 120, the communicator 130, and the input/output 160. The first electronic apparatus 100 may include a display 170, and further include a combination of a tuner 120, a communicator 130, and an input/output 160. The first electronic apparatus 100 that does not have a tuner and has the display 170 may be electrically connected to an external electronic apparatus (not illustrated) that has a tuner. Alternatively, the first electronic apparatus 100 may not include the display 170.

The first electronic apparatus 100 may be implemented by, for example, an analog television (TV), a digital TV, a three dimensional (3D) TV, a smart TV, a light emitting diode (LED) TV, an organic light emitting diode (OLED) TV, a plasma TV, a monitor, a curved TV having a screen having a fixed curvature, a flexible TV having a screen having a fixed curvature, a bended TV having a screen having a fixed curvature, a curvature variable TV in which a current curvature of a screen may be varied by a received user input, or the like. The first electronic apparatus 100 may be implemented by an apparatus controlled by a remote controller through an infrared ray. In addition, it will be easily understood by those skilled in the art that the first electronic apparatus 100 may include an apparatus that may be purchased by business to business (B2B) transaction or an apparatus that may be purchased by business to customer (B2C) transaction, but is not limited thereto.

The first electronic apparatus 100 includes the tuner 120, the communicator 130, a microphone 140, a camera 145, a light receiver 150, the input/output 160, the display 170, an audio output 175, storage 180, and a power supplier 190. The first electronic apparatus 100 may include sensors (for example, an illumination sensor, a temperature sensor, and the like (not illustrated)) detecting an internal or external state of the first electronic apparatus 100.

Components in the case in which the first electronic apparatus is implemented to include all of a broadcasting tuning function, a communication function, a display function, an audio output function, and the like, are illustrated in FIG. 2. However, components of the electronic apparatus are not necessarily limited to those illustrated in FIG. 2.

According to exemplary embodiments of the present disclosure, components of the electronic apparatus may be variously modified. For example, according to an exemplary embodiment of the present disclosure, the electronic apparatus may also be implemented to include a display, a light receiver, and a controller. It is obvious that requisite components of the electronic apparatus according to various exemplary embodiments may be variously modified or combined with each other.

The controller 110 may include a processor 111, a read only memory (ROM) (or a non-volatile memory) 112 in which a control program for a control of the first electronic apparatus 100 is stored, and a random access memory (RAM) (or a volatile memory) 113 storing signals or data input from the outside of the first electronic apparatus 100 therein or used as a storing region corresponding to various processes performed in the first electronic apparatus 100.

The controller 110 controls a general operation of the first electronic apparatus 100 and signal flows among internal components 120 to 190 of the first electronic apparatus 100, and serves to process data. The controller 110 controls power supplied from a power supplier 190 to the internal components 120 to 180. In addition, in the case in which a user input is present or an event satisfying a preset and stored condition occurs, the controller 110 may execute an operating system (OS) stored in the storage 180 and various applications.

The processor 111 may include a graphic processing unit (not illustrated) for processing a graphic corresponding to an image or a video. The processor 111 may be implemented by a system on chip (SoC) including a core (not illustrated) and a graphic processing unit (GPU) (not illustrated). Alternatively, the processor 111 may be implemented by an SoC including at least one of the ROM 112 and the RAM 113. The processor 111 may include a single core, a dual core, a triple core, a quad core, or a multiple-number core thereof.

The processor 111 may include a plurality of processors. The plurality of processors may include a main processor (not illustrated) and a sub-processor (not illustrated).

The plurality of processors (for example, the main processor and the sub-processor) may be operated or may not be operated depending on states of the display apparatus 100. For example, the main processor (not illustrated) may be operated in a normal mode in which a broadcasting screen is displayed, which is one of the states of the first electronic apparatus 100. Alternatively, the main processor (not illustrated) may be operated in a pre-power on mode, which is a process between a standby mode corresponding to screen-off and the normal mode.

The sub-processor (not illustrated) may be operated in the screen-off (or the standby mode), which is one of the states of the first electronic apparatus 100. In the screen-off and/or the pre-power on mode, the controller 110 including the sub-processor (not illustrated) may also be operated.

The plurality of processors may further include a sensor processor (not illustrated) controlling a sensor (not illustrated) as well as the main processor (not illustrated) and the sub-processor (not illustrated). Alternatively, the plurality of processors may also include the main processor and the sensor processor (not illustrated).

The processor 111, the ROM 112, and the RAM 113 may be connected to one another through an internal bus.

The controller 110 controls the display and the light receiver receiving control information from the second remote controller 200 capable of remotely controlling the first electronic apparatus using light, controls the power supplier to supply power to the display depending on first control information received from the second remote controller 200 to control the display to display a first screen, controls the display to change the first screen into a second screen that may control the electronic apparatus and display the second screen depending on second control information received from the second remote controller 200, and controls an operation of the electronic apparatus depending on one selected among a plurality of control items of the second screen depending on third control information received from the second remote controller 200.

The controller 110 may control the light receiver to receive the first control information, the second control information, and the third control information each transmitted by a selection of the same button in the second remote controller 200.

In the case in which the first control information is received from the second remote controller 200 for a set time or more, the controller 110 may control the power supplier to supply power to the display.

The controller 110 includes the main processor and the sub-processor, and in the case in which the first control information is received from the second remote controller 200 for a first set time or more, the sub-processor may control the power supplier to supply power to the display.

In the case in which the first screen is displayed on the display and the second control information is not received for a second set time, the controller 110 may control the power supplier to power off the display.

In the case in which the third control information corresponding to the long press is received, the controller 110 may perform a user interface (UI) indicating an item to be selected to move between control items arranged in a circular shape or control items uni-directionally arranged depending on a time of the long press.

The controller 110 may control the display to display a guide corresponding to the movement of the UI indicating the item to be selected between the control items so as to be adjacent to the control items.

In the case in which fourth control information is additionally received from the second remote controller 200, the controller 110 may perform a control so that one of a plurality of control items selected by the third control information is executed by the fourth control information.

In the case in which or when the is power-off, which is one of the plurality of control items, is selected by the third control information and the fourth control information corresponding to execution of the power-off is received from the second remote controller 200, the controller 110 may control the electronic apparatus to be powered off.

The controller 110 may control the display the plurality of control items of the second screen in the same form by another remote controller as well as the second remote controller 200 capable of transmitting control information to the electronic apparatus.

The controller 110 may perform a control to provide one of a visual feedback and an auditory feedback corresponding to the display of the first screen to the user.

The controller 110 may perform a control to provide one of a visual feedback and an auditory feedback corresponding to the display of the second screen to the user.

In an exemplary embodiment of the present disclosure, a term 'controller 110 of the first electronic apparatus' includes the processor 111, the ROM 112, and the RAM 113 of the first electronic apparatus 100. Alternatively, the term 'controller 110 of the first electronic apparatus' includes the main processor (not illustrated), the sub-processor (not illustrated), the ROM 112, and the RAM 113 of the first electronic apparatus 100. Alternatively, the term 'controller 110 of the first electronic apparatus' includes the main processor (not illustrated), the sub-processor (not illustrated), the sensor processor (not illustrated), the ROM 112, and the RAM 113 of the first electronic apparatus 100.

It will be easily understood by those skilled in the art that a configuration and an operation of the controller 110 may be variously implemented according to exemplary embodiments.

The tuner 120 may tune and select only a frequency of a channel that is intended to be received in the display apparatus 100 among many radio wave components through amplification, mixing, resonance, or the like, of broadcasting signals received in a wired or wireless scheme. The broadcasting signals include a video, audio, and additional data (for example, an electronic program guide (EPG)).

The tuner 120 may receive a video, an audio, and data in a frequency band corresponding to a user input (for example, control information (channel up/down, or the like) received from the first remote controller (not illustrated) or the second remote controller 200).

The tuner 120 may receive the broadcasting signals from various sources such as terrestrial broadcasting, cable broadcasting, satellite broadcasting, Internet broadcasting, and the like. The tuner 120 may also receive the broadcasting signals from a source such as analog broadcasting, digital broadcasting, or the like. The tuner 120 may be implemented integrally with (all-in-one) the first electronic apparatus 100 or be implemented by a separate device (for example, a set-top box (not illustrated)) having a tuner unit electrically connected to the first electronic apparatus 100 or a tuner (not illustrated) connected to the input/output 160.

The communicator 130 may connect the first electronic apparatus 100 to the first remote controller, the second remote controller 200 or another electronic apparatus (not illustrated) by a control of the controller 110. The controller 110 may download an application from the outside or perform web browsing through the communicator 130. In addition, the communicator 130 may receive control information corresponding to a control of the first electronic apparatus 100 from the first remote controller or the second remote controller 200.

The communicator 130 may include one of a wired Ethernet 131, a wireless local area network (WLAN) communicator 132, and a Bluetooth communicator 133 depending on a performance and a structure of the first electronic apparatus 100. Alternatively, the communicator 130 may include a combination of a wired Ethernet 131, a WLAN communicator 132, and a Bluetooth communicator 133. Short range communication including the Bluetooth communicator 133 may include, for example, Bluetooth low energy, infrared data association (IrDA), ultra-wideband (UWB), near field communication (NFC), or the like.

The communicator 130 according to an exemplary embodiment of the present disclosure may receive the control information transmitted from the second remote controller 200. In the case in which the second remote controller 200 and the first electronic apparatus 100 communicate with and are connected to each other in a Bluetooth scheme, the Bluetooth communicator 133 may receive the control information transmitted from the second remote controller 200 by a control of the controller 110.

The microphone 140 may receive an uttered speech of the user. The microphone 140 may convert the received speech into an electrical signal and output the electrical signal to the controller 110. The speech of the user may include, for example, a speech corresponding to a control of menus or functions of the first electronic apparatus 100. A recognition range of the microphone 140 may be changed depending on a magnitude of a voice of the user and the surrounding environments (for example, a sound of a speaker and surrounding noise).

The microphone 140 may be implemented integrally with the first electronic apparatus 100 or be separated from the first electronic apparatus 100. The microphone 140 separated from the first electronic apparatus 100 may be electrically connected to the first electronic apparatus 100 through the communicator 130 or the input/output 160.

The camera 145 photographs a video (for example, continuous frames) corresponding to a motion of the user in a recognition range of the camera. The motion of the user may include, for example, presence (for example, appearance of the user in the recognition range of camera) of the user, a portion of a body of the user such as a face, a facial expression, a hand, a fist, or a finger of the user, a motion of a portion of the body of the user, or the like. The recognition range of the camera 145 may be a range of 0.2 to 5 m from the camera 145 to the user.

The camera 145 may include a lens (not illustrated) and an image sensor (not illustrated). The camera 145 may support an optical zoom or a digital zoom using a plurality of lenses and image processing.

The camera 145 may be positioned at one of an upper end, a lower end, a left side, and a right side of the display apparatus 100. Alternatively, the camera 145 may be positioned in one of an upper central region, a lower right region, a lower central region, and a lower left region.

The camera 145 may convert the photographed video into an electrical signal and store the electrical signal in the storage by a control of the controller 110. The controller 110 analyzes the photographed video to recognize the motion of the user. The controller 110 may display menus on the first electronic apparatus 100 using a motion recognition result or perform a control (for example, channel adjustment, volume adjustment, or the like) corresponding to the motion recognition result.

In the case in which the number of cameras 145 is plural, a three-dimensional still image or a three-dimensional motion may be received using a first camera (not illustrated) disposed on a front surface of the first electronic apparatus 100 and a second camera (not illustrated) adjacent to the first camera (that is, positioned at a distance larger than 5 mm and smaller than 80 mm from the first camera).

The camera 145 may be implemented integrally with the first electronic apparatus 100 or be separated from the first electronic apparatus 100. A separate apparatus (not illustrated) including the camera (not illustrated) separated from the first electronic apparatus 100 may be electrically connected to the first electronic apparatus 100 through the communicator 130 or the input/output 160.

The light receiver 150 receives an optical signal (including control information) output from the second remote controller 200 through an optical window (not illustrated).

In an exemplary embodiment of the present disclosure, the light receiver 150 may receive an optical signal corresponding to a user input (for example, a press of a button) from the second remote controller 200. The control information may be extracted from the received optical signal. The received optical signal and/or the extracted control information may be transmitted to the controller 110.

The light receiver 150 according to an exemplary embodiment of the present disclosure may receive one or two or more control information from the second remote controller 200 by the supply of power by the power supplier 190 in the first electronic apparatus 100 that is in a power-off state (however, a state in which a power plug is connected to a power receptacle).

The input/output 160 receives content from the outside of the first electronic apparatus 100 by a control of the controller 110. The received content may include, for example, a video, an image, a text, or a web document.

The input/output 160 may include one of a high-definition multimedia interface (HDMI) port 161, a component input jack 162, a PC input port 163, and a universal serial bus (USB) input jack 164 corresponding to the reception of the content. Alternatively, the input/output 160 may include a combination of an HDMI input port 161, a component input jack 162, a PC input port 163, and a USB input jack 164. It will be easily understood by those skilled in the art that other components may be added to the components of the input/output 160 described above or some of the components of the input/output 160 described above may be deleted and/or changed, depending on a performance and a structure of the first electronic apparatus 100.

The display 170 displays the video included in the broadcasting signal received through the tuner 120 by a control of the controller 110. The display 170 may display the content (for example, the video) input through the communicator 130 or the input/output 160. The display 170 may output content stored in the storage 180 by a control of the controller 110. In addition, the display 170 may display a speech user interface (UI) for performing a speech recognition task corresponding to speech recognition or a motion UI for performing a motion recognition task corresponding to motion recognition. For example, the speech UI may include a speech instruction guide, and the motion UI may include a motion instruction guide.

A screen of the first electronic apparatus 100 according to an exemplary embodiment of the present disclosure may be used as a meaning including the content displayed on the display 170 of the first electronic apparatus 100 or a control item controlling the first electronic apparatus 100.

The display 170 according to an exemplary embodiment of the present disclosure may display a first screen 410 corresponding to the first control information received from the second remote controller 200 by a control of the controller 110. The first screen may include a user interface (UI) for confirming whether the first control information received from the second remote controller 200 is an input intended by the user or an input unintended by the user.

The controller 110 and an operation allowing the first screen to be displayed on the display 170 will be again described below in detail with reference to the accompanying drawings.

The display 170 may output a visual feedback corresponding to the display of the first screen 410 depending on the first control information received from the second remote controller 200 by a control of the controller 110.

The display 170 may display a second screen 430 or 435 by a control of the controller 110. The second screen may include a user interface (UI) including one or two or more control items that may be selected for controlling the first electronic apparatus 100 using the second remote controller 200. In the case in which the first screen is displayed on the first electronic apparatus 100, the controller 110 may display the second screen on the display 170 depending on the second control information received from the second remote controller 200.

The controller 110 and an operation allowing the second screen to be displayed on the display 170 will be again described below in detail with reference to the accompanying drawings.

The display 170 may also output a visual feedback corresponding to the display of the second screen 430 or 435 depending on the second control information received from the second remote controller 200 by a control of the controller 110.

A display 170 according to another exemplary embodiment of the present disclosure may be separated from the first electronic apparatus 100. The display 170 may be electrically connected to the first electronic apparatus 100 through the input/output 160 of the first electronic apparatus 100.

The audio output 175 outputs the audio included in the broadcasting signal received through the tuner 120 by a control of the controller 110. The audio output 175 may output an audio (corresponding to, for example, a speech or a sound) input through the communicator 130 or the input/output 160. In addition, the audio output 175 may output an audio file stored in the storage 180 by a control of the controller 110.

The audio output 175 may include one of a speaker 176, a headphone output terminal 177, and an S/PDIF output terminal 178. Alternatively, the audio output 175 may include a combination of a speaker 176, a headphone output terminal 177, and an S/PDIF output terminal 178.

The audio output 175 according to an exemplary embodiment of the present disclosure may output an auditory feedback corresponding to the display of the first screen depending on the first control information received from the second remote controller 200 by a control of the controller 110 of the first electronic apparatus 100. Alternatively, the audio output 175 may output an auditory feedback corresponding to the display of the second screen depending on the second control information received from the second remote controller 200 by a control of the controller 110.

The storage 180 may store various data, programs, or applications for driving and controlling the first electronic apparatus 100 therein by a control of the controller 110. The storage 180 may store input/output signals or data corresponding to driving of the tuner 120, the communicator 130, the microphone 140, the camera 145, the light receiver 150, the input/output 160, the display 170, the audio output 175, and the power supplier 190 therein.

The storage 180 may store a control program for a control of the first electronic apparatus 100 and a control of the controller 110, an application initially provided from a manufacturer or downloaded from the outside, a graphical user interface (hereinafter, referred to as a 'GUI') related to the application, an object (for example, an image text, an icon, a button, or the like) for providing the GUI, user information, a document, databases, or related data therein.

The storage 180 may include a broadcasting receiving module, a channel control module, a volume control module, a communication control module, a speech recognizing module, a motion recognizing module, a light receiving module, a display control module, an audio control module, an external input control module, a power control module, a speech database (DB), or a motion database (DB) that are not illustrated. The storage 180 may store software capable of performing a broadcasting receiving control function, a channel control function, a volume control function, a communication control function, a speech recognizing function, a motion recognizing function, a light receiving control function, a display control function, an audio control function, an external input control function, or a power control function in the first electronic apparatus 100 therein. The controller 110 may perform functions of the first electronic apparatus 100 using the software stored in the storage 180.

The storage 180 may store display apparatus information or remote controller information therein.

The storage 180 may store a remote control data format corresponding to the first remote controller 200*a* therein.

The storage 180 may store a moving picture, an image, or a text corresponding to the visual feedback therein.

The storage 180 may store a sound corresponding to the auditory feedback therein.

The storage 180 may store a feedback providing time (for example, 300 ms) of a feedback provided to the user therein.

In an exemplary embodiment of the present disclosure, a term 'storage' may be used as a term including the storage 180, the ROM 112 and the RAM 112 of the controller 110, a storage (not illustrated) implemented by an SoC (not illustrated), a memory card (for example, a micro SD card, a USB memory) (not illustrated) mounted in the first electronic apparatus 100, or an external storage (for example, a USB memory, or the like) (not illustrated) that may be connected to the USB input jack 164 of the input/output 160. In addition, the storage may include a non-volatile memory, a volatile memory, a hard disk drive (HDD), or a solid state drive (SDD).

The power supplier 190 supplies power input from an external power source to the internal components 120 to 180 of the first electronic apparatus 100 by a control of the controller 110. The power supplier 190 may supply power provided from one or two or more batteries (not illustrated) positioned in the first electronic apparatus 100 to the internal components 120 to 180 by a control of the controller 110.

The power supplier 190 may include a first power supplier (not illustrated) supplying power to the light receiver 150 of the first electronic apparatus 100 that is in a power-off state (or a screen-off state of the first electronic apparatus 100 and a state in which a power plug is connected to a power receptacle). Alternatively, the power supplier 190 may include a first power supplier (not illustrated) supplying power to the light receiver 150 of the first electronic apparatus 100 that is in a power-off state (however, a state in which a power plug is connected to a power receptacle) and the sub-processor (not illustrated) controlling the light receiver 150. The power supplier 190 may include a second power supplier (not illustrated) supplying power to the light receiver 150 of the first electronic apparatus 100 that is in a power-off state (however, a state in which a power plug is connected to a power receptacle) and the sensor processor (not illustrated) controlling the light receiver 150. Alternatively, the power supplier 190 may include a second power supplier (not illustrated) supplying power to the light receiver 150 of the first electronic apparatus 100 that is in a power-off state (however, a state in which a power plug is connected to a power receptacle) and the sub-processor (not illustrated) and the sensor processor (not illustrated) controlling the light receiver 150.

The power supplier 190 may further include a battery (not illustrated) supplying power to the light receiver 150 of the first electronic apparatus 100 that is in a power-off state (however, a state in which a power plug is connected to a power receptacle).

At least one component may be added to the components 120 to 190 of the first electronic apparatus 100 illustrated in FIGS. 1 and 2 or some of the components 120 to 190 of the first electronic apparatus 100 illustrated in FIGS. 1 and 2 may be changed (at least one of components in boxes represented by dotted lines is changed) or be deleted (at least one of components in boxes represented by dotted lines is deleted), depending on a performance and/or a kind of the first electronic apparatus 100. In addition, it will be easily understood by those skilled in the art that positions of the components 120 to 190 may be changed depending on the performance or the kind of the first electronic apparatus 100.

Hereinafter, an example of a case of controlling a first electronic apparatus will be described in detail.

The second remote controller 200 dedicatedly and remotely controlling the second electronic apparatus 100-1 includes a controller 210, an input 260, a communicator 230, a light output 250, storage 280, and a power supplier 290. Alternatively, the second remote controller 200 may include only one of the communicator 230 and the light output 250. In addition, the second remote controller 200 may also not include the storage 280.

In an exemplary embodiment of the present disclosure, the second remote controller 200 may be used as a term indicating an apparatus capable of controlling the second electronic apparatus 100-1 by transmitting an optical signal (for example, through an infrared ray).

The second remote controller 200 may include an apparatus in which an application (not illustrated) for a control of the second electronic apparatus 100-1 may be installed and which includes the light output 250. The apparatus in which the application (not illustrated) for a control of the second electronic apparatus 100-1 may be installed may have a display (for example, a display including only a display panel without a touch screen or a touch panel) and the light output 250.

The apparatus having the display and the light output 250 may include a cellular phone (not illustrated), a smartphone (not illustrated), a tablet PC (not illustrated), a laptop PC (not illustrated), another display apparatus (not illustrated), or home appliances (for example, a refrigerator, a washing machine, a cleaner, and the like). The user may control the first electronic apparatus 100 using a function key (for example, a channel key) (not illustrated) in a graphical user interface (GUI) (not illustrated) provided in the application.

The controller 210 may include a processor 211, a ROM (or a non-volatile memory) 212 in which a control program for a control of the second remote controller 200 is stored, and a RAM (or a volatile memory) 213 storing signals or data input from the outside of the second remote controller 200 therein or used as a storing region for various processes performed in the second remote controller 200.

The controller 210 controls a general operation of the second remote controller 200 and signal flows among internal components 230 to 290 of the second remote controller 200, and serves to process data. The controller 210 controls supply of power to the internal components 230 to 280 using the power supplier 290. In addition, the processor 211, the ROM 212, and the RAM 213 may be connected to one another through an internal bus.

The controller 210 may perform a control to transmit first control information (corresponding to a long press of a first button 261*f*), second control information (corresponding to a long press of the first button), third control information (corresponding to a long press of the first button), and/or fourth control information (corresponding to a short press of the first button) corresponding to a selection of the first button 261*f* to the first electronic apparatus 100 through the light output 250. The first control information, the second control information, and the third control information may have the same waveform. The first control information, the second control information, and the third control information may be distinguished from each other by a state of the first electronic apparatus 100 and a first screen, a second screen, and a third screen displayed on the first electronic apparatus 100.

The controller 210 may perform the storage 280 to store first button selection information corresponding to a selection of the first button 261*f*, first button selection information corresponding to a re-selection of the first button 261*f*, item selection information of the second screen corresponding to a re-selection of the first button 261*f*, and/or item execution information of the second screen corresponding to a re-selection of the first button 261.

In an exemplary embodiment of the present disclosure, a term 'controller 210 of the remote controller' includes the processor 211, the ROM 212, and the RAM 213 of the second remote controller 200.

The communicator 230 may transmit control information (for example, control information corresponding to power-on/off, or the like) corresponding to a user input (for example, a press, or the like) to the first electronic apparatus 100, which is a control target, by a control of the controller 210. The communicator 230 may be wirelessly connected to the first electronic apparatus 100 by a control of the controller 210. The communicator 230 may include one or both of a WLAN communicator 231 and a Bluetooth communicator 232.

The WLAN communicator 231 may be wirelessly connected to an application processor (AP) at a place at which the AP is installed by a control of the controller 210. The WLAM communicator 231 may include, for example, Wi-Fi. The WLAN communicator 231 may support a WLAN standard (IEEE802.11x) of Institute of electrical and electronics engineers (IEEE). In addition, the Bluetooth communicator 232 may wirelessly perform Bluetooth communication between the second remote controller 200 and the first electronic apparatus 100 without an AP by a control of the controller 210.

The light output 250 outputs an optical signal (for example, an optical signal including control information) corresponding to a user input (for example, a press of a button, or the like) to the light receiver 150 of the first electronic apparatus 100 by a control of the controller 210. The light output 250 may include an infrared-light emitting diode (IR-LED).

The optical signal may be output to the first electronic apparatus 100 depending on a remote control data format (or a remote control code format) of the second remote controller 200. The optical signal output from the light output 250 may be modified into a carrier wave and be then output. The control information may be stored in the storage 280 or be generated by the controller 210.

The mote control data format used in the second remote controller 200 may be one of a remote controller code format dedicated to a manufacturer or a commercial remote controller code format.

The remote control data format consists of, for example, information on a bit pattern, a bit timing, the number of remote controller code bits, a carrier frequency, presence and timings of a header or lead pulse, a stop pulse or end pulse and a tail pulse, a special form for performing a selected control, and the number of times of repetition.

The remote control data format may include, for example, a leader code (or a lead code) informing the start of remote control data and a data word in the case of an NEC code. The data word may include an address code and a data code.

It will be easily understood by those skilled in the art that the remote control data format described above is an example and may be changed depending on a manufacturer and/or an electronic apparatus.

Due to the remote control data format changed depending on a manufacturer and/or an electronic apparatus, in the case in which the user loses the remote controller, he/she may control the electronic apparatus by purchasing a new remote controller or a panel key (not illustrated) of the electronic apparatus.

The input 260 may include a button 261 or a touch pad 262 receiving a user input (for example, a press) for controlling the first electronic apparatus 100. The input 260 may include a microphone 263 receiving an uttered speech of the user, a sensor 264 detecting a motion of the second remote controller 200, or a vibration motor (not illustrated) providing a tactile feedback.

The button 261 may include the buttons 261*a* to 261*l* of FIG. 1.

The touch pad 262 may receive a touch of the user or a touch gesture of the user.

The microphone 263 receives the speech of the user. The microphone 263 may convert the received speech into an electrical signal and output the electrical signal to the controller 210.

The sensor 264 may include, for example, a motion sensor (not illustrated) detecting a motion of the second remote controller 200, a gyro sensor (not illustrated) detecting a direction using rotational inertia of the second remote controller 200, an acceleration sensor (not illustrated) detecting an acceleration of three axes (for example, an X axis, a Y axis, and a Z axis) applied to the second remote controller 200, or a gravity sensor (not illustrated) detecting an action direction of gravity.

The vibration motor (not illustrated) may convert the electrical signal into mechanical vibrations depending on a control of the controller 210. For example, the vibration motor (not illustrated) may include a linear vibration motor, a bar type vibration motor, a coin type vibration motor, or a piezoelectric element vibration motor.

The display 270 may include, for example, a liquid crystal display (LCD) type display, an organic light emitting diode (OLED) type display, a plasma display panel (PDP) type display, or a vacuum fluorescent display (VFD) type display. In addition, the display 270 may be a touch screen.

The display 270 may display a text, an icon, and/or a symbol corresponding to a received user input (for example, a press).

The storage 280 may store various data, programs, or applications for driving and controlling the second remote controller 200 therein by a control of the controller 210. The storage 280 may store input or output signals or data corresponding to driving of the communicator 230, the light output 250, and the power supplier 290 therein.

The storage 280 may store control information corresponding to a received user input (for example, a touch, a press, a touch gesture, a speech, or a motion) therein by a control of the controller 210. In addition, the storage 280 may store a remote control data format corresponding to the control information therein by a control of the controller 210.

The storage 280 may store remote controller information corresponding to the second remote controller 200 therein. The remote controller information may include a model name, unique device identification (ID), a remaining amount of a memory, whether or not object data are present, a Bluetooth version, or a Bluetooth profile.

The storage 280 may store the first control information (corresponding to the long press of the first button 261*f*), the second control information (corresponding to the long press of the first button), the third control information (corresponding to the long press of the first button), and/or the fourth control information (corresponding to the short press of the first button) corresponding to the selection of the first button 261f therein by a control of the controller 210.

The storage 280 may store the first button selection information corresponding to the selection of the first button 261f, the first button selection information corresponding to the re-selection of the first button 261f, the item selection information of the second screen corresponding to the re-selection of the first button 261f, and/or the item execution information of the second screen corresponding to the re-selection of the first button 261 therein by a control of the controller 210.

The power supplier 290 supplies power to the components 230 to 280 of the second remote controller 200 by a control of the controller 210. The power supplier 290 may supply power from one or two or more batteries (not illustrated) positioned in the second remote controller 200 to the components 230 to 280. The batteries may be positioned between a surface of the second remote controller 200 (on which the button 261 is positioned) and a rear surface (not illustrated) of the second remote controller 200.

At least one component may be added to the components of the second remote controller 200 illustrated in FIGS. 1 and 2 or some of the components of the second remote controller 200 illustrated in FIGS. 1 and 2 may be changed (at least one of components in boxes represented by dotted lines is changed) or be deleted (at least one of components in boxes represented by dotted lines is deleted), depending on a performance of the second remote controller 200. In addition, it will be easily understood by those skilled in the art that positions of the components may be changed depending on a performance or a structure of the second remote controller 200.

Although an example in which the second remote controller 200 includes both of the light output 250 and the Bluetooth communicator 232 has been illustrated in FIG. 2, in the case in which control information is implemented to be transmitted in an IR scheme, the second remote controller 200 may include the light output 250 without the Bluetooth communicator 232, or vice versa.

FIG. 3 is a schematic flow chart illustrating a method for controlling an electronic apparatus according to an exemplary embodiment of the present disclosure.

FIGS. 4A to 4G are schematic views illustrating an example of a method for controlling an electronic apparatus according to an exemplary embodiment of the present disclosure.

In S310 of FIG. 3, the electronic apparatus is powered off.

Figure 4A:
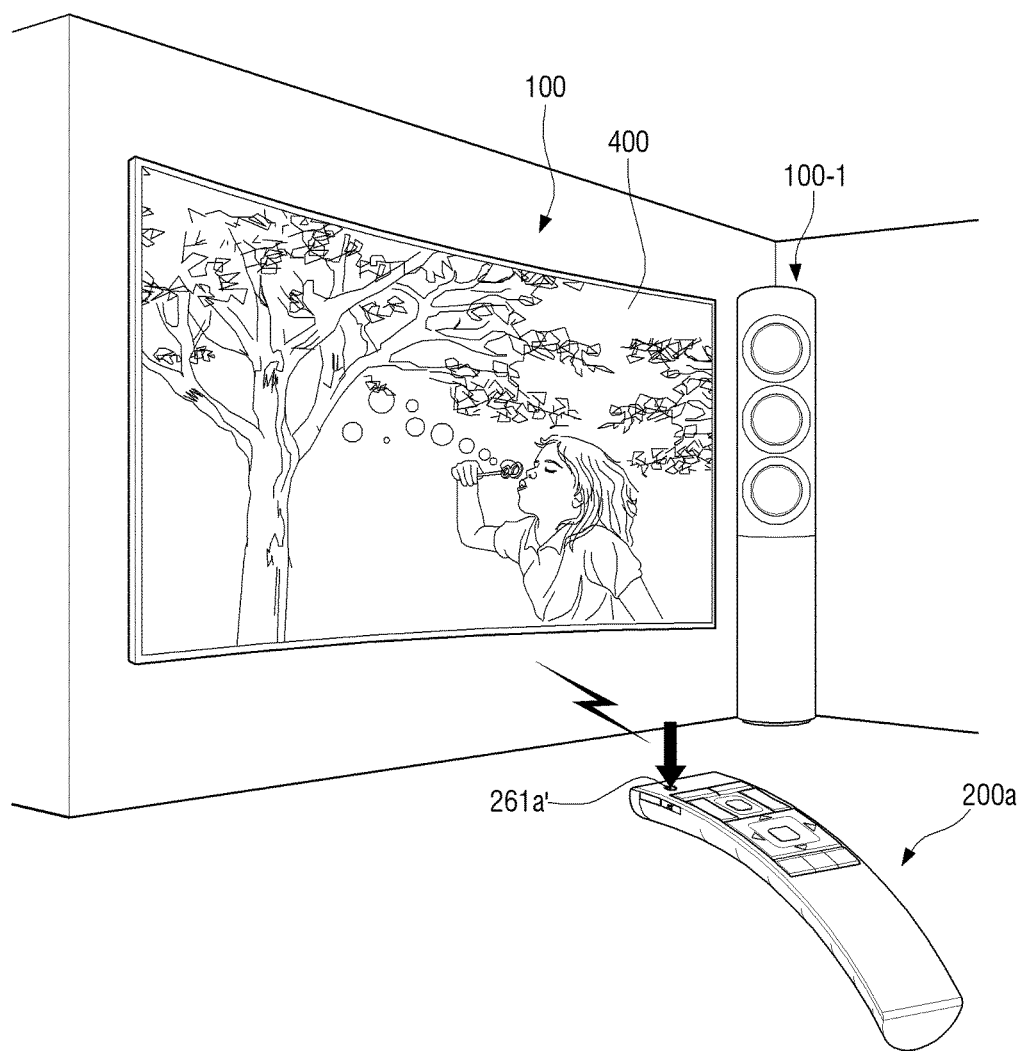
FIGS. 4A to 4G are schematic views illustrating an example of a method for controlling an electronic apparatus according to an exemplary embodiment of the present disclosure.
Figure 4B:
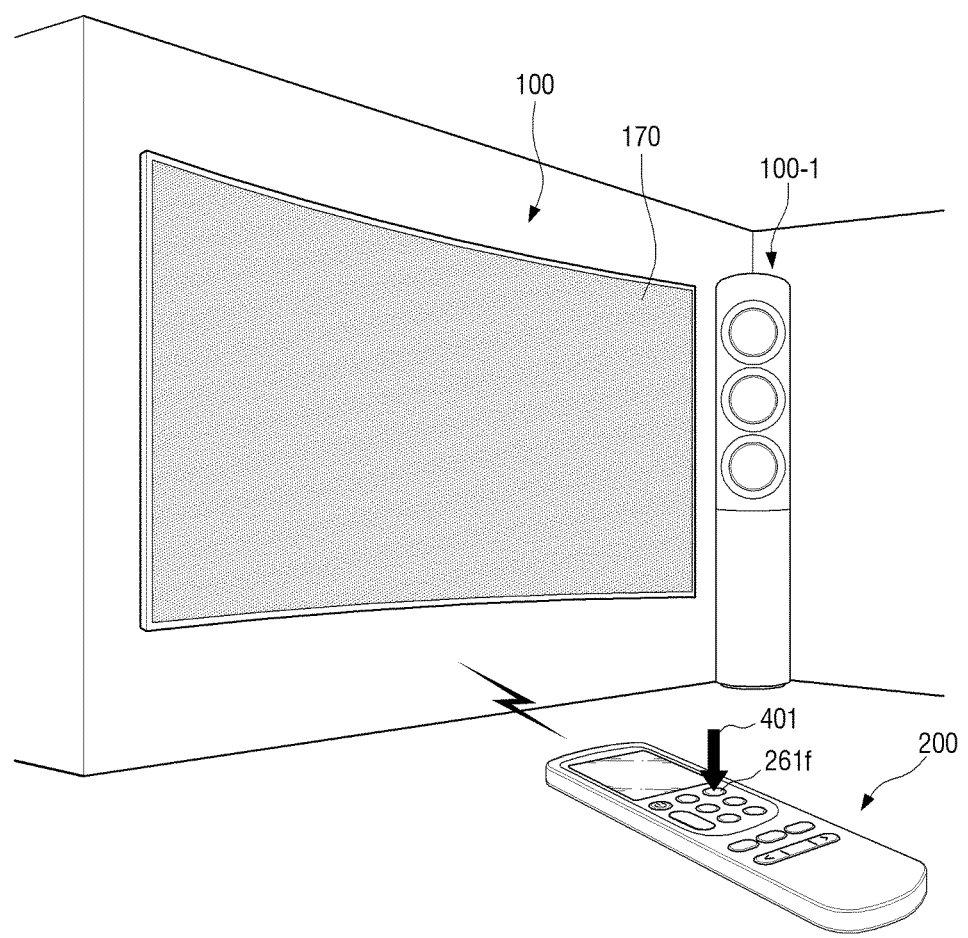

Referring to FIGS. 4A and 4B, the user may turn off the display (or the screen) 170 of the first electronic apparatus 100 displaying a content (for example, broadcasting channel No. 100) 400. For example, the user may turn off the screen of the first electronic apparatus 100 by selecting a power button 261a' of the first remote controller 200a. Alternatively, the user may turn off the screen of the first electronic apparatus 100 using a panel key (not illustrated) positioned on a rear surface and/or a side surface of the first electronic apparatus 100.

In the case in which the first electronic apparatus 100 is powered off, the controller 110 may store first electronic apparatus power-off information corresponding to the power-off of the first electronic apparatus 100 in the storage 180.

The first electronic apparatus power-off information stored for managing a history may include items such as a first electronic apparatus power-off information identifier (ID), a first electronic apparatus power-off time, a first electronic apparatus power-off subject name (for example, one of the first remote controller and the panel key), a name of a final content displayed before the power-off of the first electronic apparatus, a broadcasting channel number in which the final content is displayed before the power-off of the first electronic apparatus, a broadcasting channel name in which the final content is displayed before the power-off of the first electronic apparatus, or the like.

It will be easily understood by those skilled in the art that other items may be added to the items of the stored first electronic apparatus power-off information and some of the items of the stored first electronic apparatus power-off information may be changed or deleted, depending on at least one of a function (or a performance, a structure, or the like) of the first electronic apparatus 100 and a function (or a performance, a structure, or the like) of the first remote controller 200a.

Figure 6:
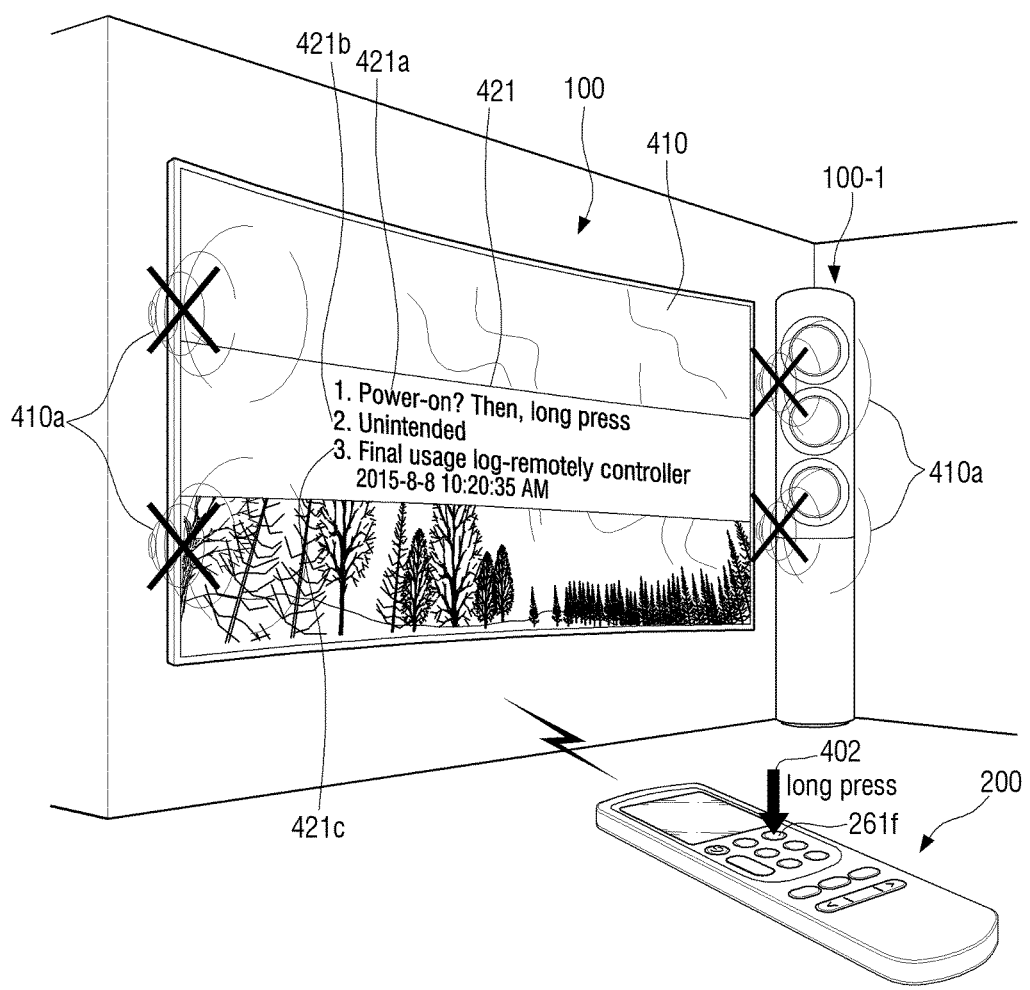
FIG. 6 is a schematic view illustrating an example of a first screen according to another exemplary embodiment of the present disclosure.

In the case in which the first electronic apparatus 100 is powered on, the controller 110 may display a final usage history in the stored first electronic apparatus power-off information on the display 170 (see FIG. 6). In the case in which the first remote controller 200a is lost, the user may search the lost first remote controller 200a using the stored first electronic apparatus power-off information.

In the case in which the screen of the first electronic apparatus 100 is turned off (or the first electronic apparatus 100 is powered off), the first electronic apparatus 100 is connected to an external power receptacle through a power cable. In the case in which the screen of the first electronic apparatus 100 is turned off (or the first electronic apparatus 100 is powered off), power may be supplied to the sub-processor (not illustrated) and the light receiver 150 by a control of the controller 110 of the first electronic apparatus 100. In addition, in the case in which the screen of the first electronic apparatus 100 is turned off (or the first electronic apparatus 100 is powered off), the supply of the power to the main processor (not illustrated) of the first electronic apparatus 100 may be blocked.

In the case in which the screen of the display apparatus 100 is turned off, the light receiver 150 may be activated by continuously supplied power, and may receive the control information output from the first remote controller 200a or the second remote controller 200.

In the case in which the screen of the first electronic apparatus 100 is turned off, the first power supplier (not illustrated) may continuously supply power to the light receiver 150 of the first electronic apparatus 100 of which the screen is turned off. In addition, in the case in which the screen of the first electronic apparatus 100 is turned off, the first power supplier (not illustrated) may continuously supply power to the light receiver 150 of the first electronic apparatus 100 of which the screen is turned off and the sub-processor (not illustrated) controlling the light receiver 150.

In the case in which the screen of the first electronic apparatus 100 is turned off, a connection between the first electronic apparatus 100 and the second remote controller 200 through short range communication may be maintained or the first electronic apparatus 100 and the second remote controller 200 may be disconnected from each other.

In an exemplary embodiment of the present disclosure, a term 'user' means a person controlling a function or an operation of the first electronic apparatus 100 using the second remote controller 200 or the first remote controller 200a, and may include a user, a manager, or an installation engineer.

In S320 of FIG. 3, the first control information corresponding to the selection of the first button is received from the second remote controller.

FIG. 5 is a schematic view illustrating an example of a remote control data format according to an exemplary embodiment of the present disclosure.

Referring to FIG. 4B, the user performs a first input 401 to the first button (for example, a mode button) 261f of the second remote controller 200 in order to power on the first electronic apparatus 100. In the present specification, an operation of selecting the first button by the user is called the first input 401. The selection of the first button 261f may include a press of the first button 261f, a touch of the first button 261f, and/or a touch gesture for the first button 261f.

The first input may include recognition of a speech of the user detected in the microphone 263 depending the power-on of the first electronic apparatus 100 or sensing (for example, grasp of the second remote controller 200 and drawing of a circle, or the like) of a motion of the second remote controller 200 detected in the sensor 264 depending on the power-on of the first electronic apparatus 100 as well as the selection of the first button 261f.

In an exemplary embodiment of the present disclosure, the first button may be one of a plurality of buttons of the second remote controller 200. In addition, it is sufficient that the first button may output an optical signal (or control information) corresponding to the first input from the second remote controller 200 to the first electronic apparatus 100.

The controller 210 of the second remote controller 200 may store 'first button selection information' corresponding to the selection of the first button 261f in the storage 280. The first button selection information stored for managing a history may include a first button selection information identifier (ID), a first button name, a first button selection time, or the like.

The controller 210 may generate the first control information using the stored first button selection information. The controller 210 may generate the first control information using the stored first button selection information and the remote control data format. In addition, the controller 210 may load or select the first control information stored in the storage 280 using the stored first button selection information. The controller 210 may load or select the first control information stored in the storage 280 using the stored first button selection information and the remote control data format.

The first control information is not control information for controlling the first electronic apparatus 100, but may be control information for controlling the second electronic apparatus (for example, an air conditioner) 100-1. For example, the first control information may be control information for selecting one of a plurality of modes (for example, an air cooling mode, a dehumidification mode, an air cleaning mode, and the like) of the second electronic apparatus 100-1.

Referring to FIGS. 4B and 5, the controller 210 may transmit the first control information to the first electronic apparatus 100. The controller 210 may periodically (for example, at a period of 45 ms to 113.7 ms that may be changed by a manufacturer and/or a product) transmit the first control information to the first electronic apparatus 100 through the light output 250. The controller 210 may periodically transmit the first control information at a first period, a second period, and/or a third period or more.

In the case in which the first control information is transmitted through the light output 250, the user may maintain the selection of the first button 261f for a set time. For example, the set time may be 2.5 seconds or 5 seconds (that may be changed by setting of a manufacturer and/or a product). Alternatively, for example, the set time may be 2 seconds or 8 seconds (that may be changed by a manufacturer and/or a product).

In (a) of FIG. 5, pattern A may be, for example, a long press of the first button 261f. In (b) of FIG. 5, pattern B may be, for example, a combination of a short press and a long press of the first button 261f. In addition, pattern C (not illustrated) may be, for example, a short press of the first button 261f.

Maintenance of the set time of the first control information may mean that the first button 261f is selected by the user for a time longer than a signal period (for example, before a continuous code subsequent to the second leader code is output) from a first leader code of the remote control data format to a subsequent second leader code.

It will be easily understood by those skilled in the art that the set time of the first control information may be changed depending on a model or a manufacturer of a remote controller that may be grasped (or selected) by the user.

The first electronic apparatus 100 receives the first control information output from the second remote controller 200 through the light receiver 150. The light receiver 150 of the first electronic apparatus 100 may receive the first control information output from the second remote controller 200 by a control of the sub-processor (not illustrated) (or the controller). The received first control information may be stored in the storage 180 by a control of the controller 110.

In S330 of FIG. 3, the first electronic apparatus is powered on.

Figure 4C:
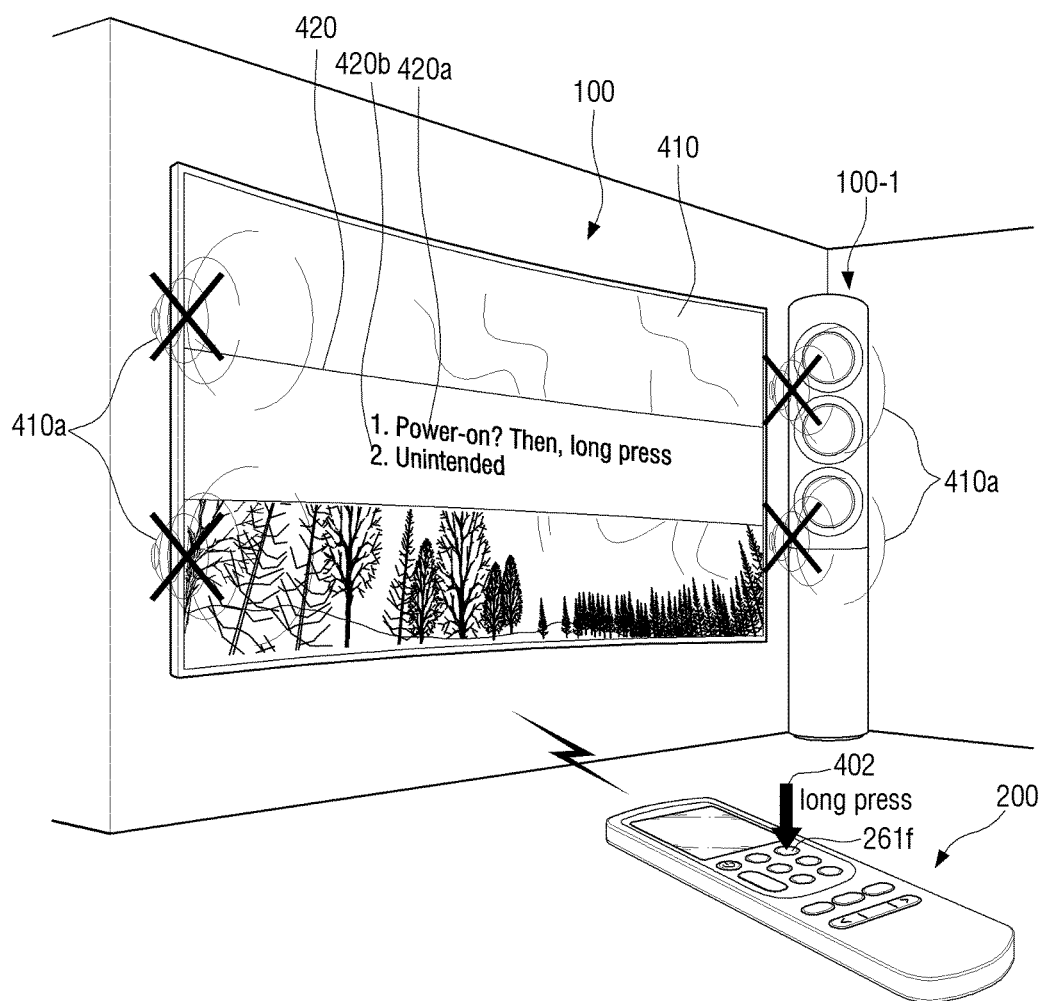

Referring to FIG. 4C, a content 410 of the first electronic apparatus 100 is displayed.

In the case in which the first control information is received from the second remote controller 200, the sub-processor (not illustrated) of the first electronic apparatus 100 may operate (for example, wake up) the main processor (not illustrated).

In the case in which the first control information is received from the second remote controller 200, the controller 110 (or the main processor) may start to analyze the received first control information. For example, the controller 110 (or the main processor) may start to analyze the remote control data format corresponding to the received first control information.

The controller 110 may compare the remote control data format corresponding to the first remote controller 200a stored in the storage 180 and the remote control data format corresponding to the received first control information with each other.

As a comparison result, the controller 110 may not analyze the received first control information. The first control information, which is control information corresponding to a mode change of the second electronic apparatus 100-1, may be difficult to be analyzed in the first electronic apparatus 100. S330 of FIG. 3 is a case in which the first control information that is difficult to be analyzed in the first electronic apparatus 100 is received.

In the case in which the first control information that is difficult to be analyzed is received, the controller 110 may determine that the first control information is received. In addition, the controller 110 may analyze a period (for example, the number of times of repetition) (see FIG. 5) of the received first control information. For example, in the case in which the first control information is received for a set time, the controller 110 may determine that the first control information is received.

In the case in which the first control information that is difficult to be analyzed is received for a set time, the controller 110 may determine that the first control information is received from another electronic apparatus (for example, the second remote controller 200 corresponding to the second electronic apparatus 100-1) rather than the first remote controller 200a corresponding to the first electronic apparatus 100.

The controller 110 may store the received first control information in the storage 180. The first control information stored for managing a history may include a first control information identifier (ID), a reception time of the first control information received from the second remote controller, the number of times of repetition of the first control information, a remote control data format corresponding to the first control information, or the like.

The controller 110 may turn on the display 170 of the first electronic apparatus 100 using the stored first control information. A content (for example, broadcasting channel No. 100) 410 may be displayed on the display 170 of the first electronic apparatus 100. In addition, in the case in which the first control information is received from the second remote controller, the controller 110 may turn on the display 170 of the first electronic apparatus 100. The content 410 may be displayed on the display 170 of the first electronic apparatus 100. The content 410 may be a content corresponding to another time zone of the content (for example, broadcasting channel No. 100) that has been already displayed on the display 170 of the first electronic apparatus 100.

In another exemplary embodiment of the present disclosure, in the case in which the first control information is received from the second remote controller 200, power may be supplied to the components 120 to 190 of the first electronic apparatus 100 except for the display 170. In the case in which the first control information is received from the second remote controller 200, the controller 110 (or the main processor) may control the power supplier 190 not to supply the power to the display 170.

In the case in which the first control information is received from the second remote controller 200, the controller 110 (or the main processor) may control the power supplier 190 to supply the power in a mode (for example, a mode in which a power consumption amount is low) different from a general mode in which the content is displayed on the display 170.

In another exemplary embodiment of the present disclosure, in the case in which the first control information is received from the second remote controller 200, the controller 110 (or the main processor) may control the power supplier 190 not to supply the power to the audio output 175.

In the case in which the first control information is received from the second remote controller 200, the controller 110 may control the power supplier 190 to supply the power in a mode (for example, a mode in which a power consumption amount is low) different from a general mode in which a sound 410a corresponding to the content 410 is output from the audio output 175.

In another exemplary embodiment of the present disclosure, in the case in which the first control information is received from the second remote controller 200, the controller 110 (or the main processor) may perform a control to operate the other components except for one of the display 170 and the audio output 175 to perform various functions (for example, content reception, broadcasting reception, or the like).

In the case in which the first control information is received from the second remote controller 200, the controller 110 (or the main processor) may perform a control so that a video, an audio, and/or data included in the received broadcasting signal are not output (for example, the video 410 is not displayed on the display 170 and/or the audio 410a is not output through the audio output 175).

In S340 of FIG. 3, a first screen is displayed.

FIG. 6 is a schematic view illustrating an example of a first screen according to another exemplary embodiment of the present disclosure.

Referring to FIG. 4C, in the case in which the display 170 is turned on by the first control information received from the second remote controller, the controller 110 may display a first screen 420 on the display 170. The first screen 420 may include a user interface (UI) for confirming whether the first control information received from the second remote controller 200 is an input intended by the user or an input unintended by the user.

In the case in which the power is supplied to the display 170 by the first control information received from the second remote controller, the controller 110 may display the first screen 420 on the display 170 blackly displayed (for example, having a background of a black color). In the case in which the power is supplied to the display 170 by the first control information received from the second remote controller, the controller 110 may display the first screen 420 at the same size as that of the display 170 (but display the remaining portion except for the first screen by a black color).

In the case in which the first control information is received from the second remote controller, the controller 110 may display the first screen 420 as a separate layer on the display 170 so as to be overlapped with the content 410. For example, the first screen 420 may be a pop-up window.

Intention of the user for power-on of the first electronic apparatus 100 may be confirmed through the first screen 420. For example, in an item of the first screen 420, '1' may include an intended control 420a of the first electronic apparatus 100 using the second remote controller 200 due to loss (or malfunction) of the first remote controller 200a, and/or '2' may include an unintended user 420b of the second remote controller 200.

In the case in which the first remote controller 200a malfunctions or is lost, the user may intend to control the first electronic apparatus 100 using the second remote controller 200. In this case, the user may select '1'.

In the case of '1', the user may again select (for example, long press) the first button 261f. In addition, in the case of '2', the user may hold still without selecting the first button 261f.

Referring to FIG. 6, in the case in which the display 170 is turned on by the first control information received from the second remote controller, the controller 110 may display a first screen 421, which is another exemplary embodiment of the present disclosure, on the display 170.

In the case in which the power is supplied to the display 170 by the first control information received from the second remote controller, the controller 110 may display the first screen 421 on the display 170 blackly displayed (for example, having a background of a black color).

In the case in which the power is supplied to the display 170 by the first control information received from the second remote controller, the controller 110 may display the first screen 421 at the same size as that of the display 170 (but display the remaining portion except for the first screen by a black color).

In the case in which the first control information is received from the second remote controller, the controller 110 may display the first screen 421 as a separate layer on the display 170 so as to be overlapped with the content 410. For example, the first screen 421 may be a pop-up window.

Intention of the user for power-on of the first electronic apparatus 100 may be confirmed through the first screen 421. For example, in an item of the first screen 421, '1' may include an intended control 421*a* of the first electronic apparatus 100 using the second remote controller 200 due to loss (or malfunction) of the first remote controller 200*a*, and/or '2' may include an unintended user 421*b* of the second remote controller 200. In addition, the first screen 421 may remind the user of loss of the first remote controller 200*a*. For example, the first screen 421 may include a final usage history expression 421*c* of the stored first electronic apparatus power-off information depending on the lost first remote controller 200*a*.

In the case of '1' intended by the user, the user may again select (for example, long press) the first button 261*f*. In the case of '2' unintended by the user, the user may hold still without selecting the first button 261*f*. In addition, in the case of '3' intended by the user, the user may temporarily search the lost first remote controller 200*a*.

In the case in which the second control information is not received from the second remote controller 200 to the first electronic apparatus 100 for a set time (for example, five minutes) (which may be changed), the first electronic apparatus 100 may be powered off. In the case in which the second control information is not received from the second remote controller 200 to the first electronic apparatus 100 for the set time, the controller 110 may turn off the display 170 and power off the first electronic apparatus 100.

In S350 of FIG. 3, the second control information corresponding to the re-selection of the first button is received.

Referring to FIG. 4C, the user may perform a second input 402 selecting the first button 261*f* of the second remote controller 200. In the present specification, an operation of re-selecting the first button by the user is called the second input 402. The user may long press the first button 261*f* depending on item 1 of the first screen 420.

The controller 210 of the second remote controller 200 may store 'first button re-selection information' corresponding to the re-selection of the first button 261*f* in the storage 280. The first button re-selection information stored for managing a history may include a first button re-selection information identifier (ID), a first button name, a first button re-selection time, a first button re-selection duration time, or the like.

The controller 210 may generate the second control information using the first button re-selection information. The controller 210 may generate the second control information using the first button re-selection information and the remote control data format. In addition, the controller 210 may load or select the second control information stored in the storage 280 using the first button re-selection information. The controller 210 may load or select the second control information stored in the storage 280 using the first button re-selection information and the remote control data format.

The second control information may be substantially similar to the first control information (for example, they have a difference in a sequence there between). A waveform of the second control information may be substantially the same as that of the first control information.

The second control information corresponding to item 1 of the second screen 420 may be control information capable of controlling the first electronic apparatus 100. In addition, the second control information may be control information for controlling the second electronic apparatus (for example, the air conditioner) 100-1. For example, the second control information may be control information for selecting one of a plurality of modes (for example, an air cooling mode, a dehumidification mode, an air cleaning mode, and the like) of the second electronic apparatus 100-1.

Similar to FIGS. 4B and 5, the controller may transmit the second control information corresponding to the long press of the first button 261*f* to the first electronic apparatus 100. The controller may periodically (for example, at a period of 45 ms to 113.7 ms that may be changed by a manufacturer and/or a product) transmit the second control information to the first electronic apparatus 100 through the light output 250. The controller may transmit the second control information to the first electronic apparatus 100 for a set time.

Since the reception of the second control information in S350 of FIG. 3 is substantially similar to the reception of the first control information in S320 of FIG. 2, an overlapped description will be omitted.

The first electronic apparatus 100 receives the second control information output from the second remote controller 200 through the light receiver 150. The light receiver 150 of the first electronic apparatus 100 may receive the second control information output from the second remote controller 200 by a control of the sub-processor (not illustrated) (or the controller). The received second control information may be stored in the storage 180 by a control of the controller 110.

The controller 110 of the first electronic apparatus 100 may compare the second control information with the first control information that has been already received. The controller 110 of the first electronic apparatus 100 may compare a waveform of the second control information with a waveform of the first control information that has been already received.

In the case in which the waveform of the second control information and the waveform of the first control information that has been already received are the same as each other, the method for controlling an electronic apparatus proceeds to S360 of FIG. 3. On the other hand, in the case in which the waveform of the second control information and the waveform of the first control information that has been already received are different from each other, the method for controlling an electronic apparatus ends.

In the case in which the second control information is not received from the second remote controller 200 to the first electronic apparatus 100 for a set time (for example, five minutes) (which may be changed), the first electronic apparatus 100 may be powered off. In the case in which the second control information is not received from the second remote controller 200 to the first electronic apparatus 100 for the set time, the controller 110 may turn off the display 170 and power off the first electronic apparatus 100.

In the case in which the second control information is received from the second remote controller 200 to the first electronic apparatus 100 for the set time (for example, five minutes) (which may be changed) in S350 of FIG. 3, the method for controlling an electronic apparatus proceeds to S360 of FIG. 3.

In the case in which the second control information is not received from the second remote controller 200 to the first electronic apparatus 100 for the set time (for example, five minutes) (which may be changed), the method for controlling an electronic apparatus ends.

In S360 of FIG. 3, a second screen for the second remote controller capable of controlling the first electronic apparatus is displayed.

Figure 4D:
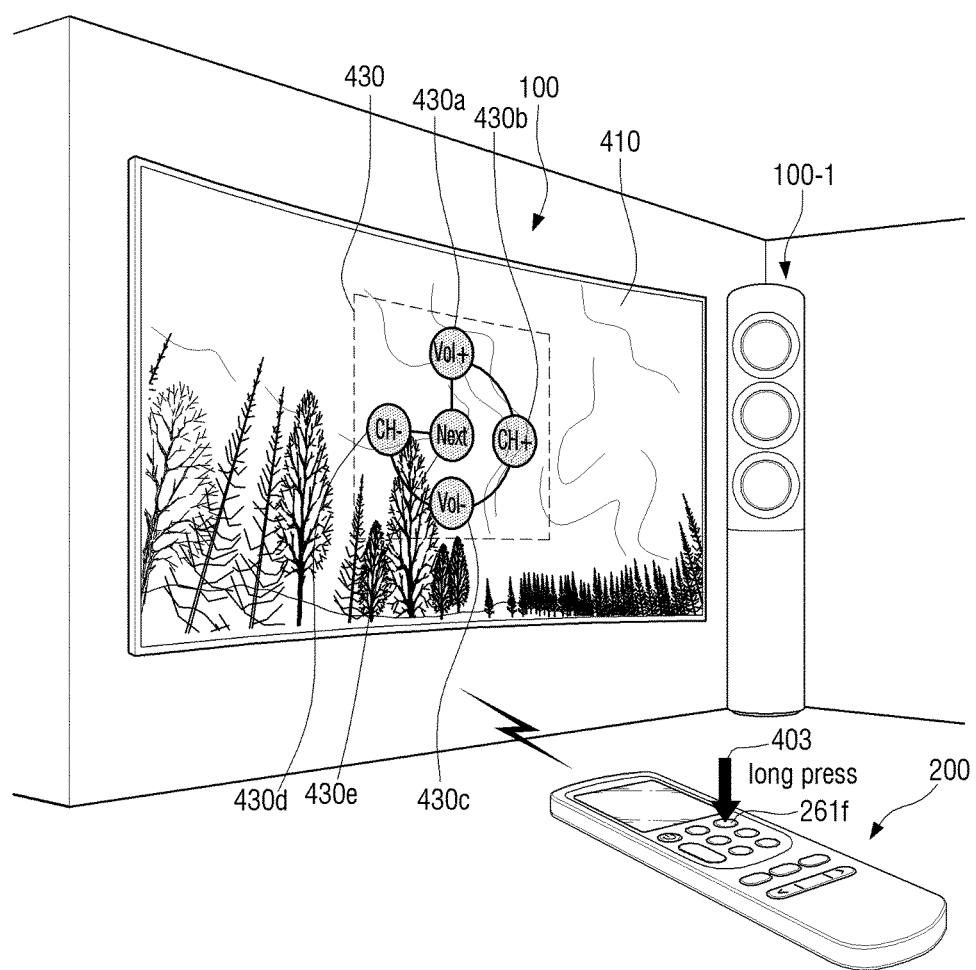

Referring to FIG. 4D, in the case in which the second control information is received from the second remote controller, the controller 110 may display a second screen 430 including a plurality of items 430a to 430i on the display 170. The second screen 430 may include a user interface (UI) including one or two or more control items that may be selected for controlling the first electronic apparatus 100 using the second remote controller 200.

The plurality of items 430a to 430i may be a plurality of control items capable of controlling functions (for example, power on/off, a volume change, a channel change, and the like) of the first electronic apparatus 100. For example, in the case in which a volume-up 430a, which is one of the plurality of control items displayed in the second screen 430 of the first electronic apparatus 100, is selected, a volume of the first electronic apparatus 100 may be increased by another control information transmitted after the second control information.

In the case in which the second control information is received from the second remote controller, the controller 110 may change the first screen 420 or 421 displayed on the display 170 into the second screen 430.

It will be easily understood by those skilled in the art that the plurality of items 430a to 430i described above are only an example, and are limited thereto. It will be easily understood by those skilled in the art that the plurality of items 430a to 430i described above may be changed depending on a kind (for example, a display apparatus, home appliances, a set-top box, an audio apparatus, or the like) of the first electronic apparatus.

It will be easily understood by those skilled in the art that other items may be added to the plurality of items 430a to 430i described above or some of the plurality of items 430a to 430i described above may be changed or deleted, depending on a performance and/or a kind of the first electronic apparatus 100.

The controller 110 may allow the plurality of items 430a to 430i described above to be displayed in the same form on a third remote controller (not illustrated), a fourth remote controller (not illustrated), or the like, as well as the second remote controller 200.

In the case in which the second control information is received from the second remote controller 200, the controller 110 may display the second screen 430 on the display 170 blackly displayed (for example, having a background of a black color).

In the case in which the power is supplied to the display 170 by the second control information received from the second remote controller 200, the controller 110 may display the second screen 430 at the same size as that of the display 170 (but display the remaining portion except for the second screen by a black color).

In the case in which the second control information is received from the second remote controller 200, the controller 110 may display the second screen 430 as a separate layer on the display 170 so as to be overlapped with the first screen 420 or 421. For example, the second screen 430 may be a pop-up window.

The user may control the first electronic apparatus 100 through the second remote controller 200 and the second screen 430. The second screen 430 may be a circular user interface (UI) or a uni-directional UI (for example, see FIG. 7).

In the case in which the third control information is not received from the second remote controller 200 to the first electronic apparatus 100 for a set time (for example, five minutes) (which may be changed), the first electronic apparatus 100 may be powered off. In the case in which the third control information is not received from the second remote controller 200 to the first electronic apparatus 100 for the set time, the controller 110 may turn off the display 170 and power off the first electronic apparatus 100.

In S370 of FIG. 3, the third control information corresponding to the re-selection of the first button is received from the second remote controller.

Figure 4E:
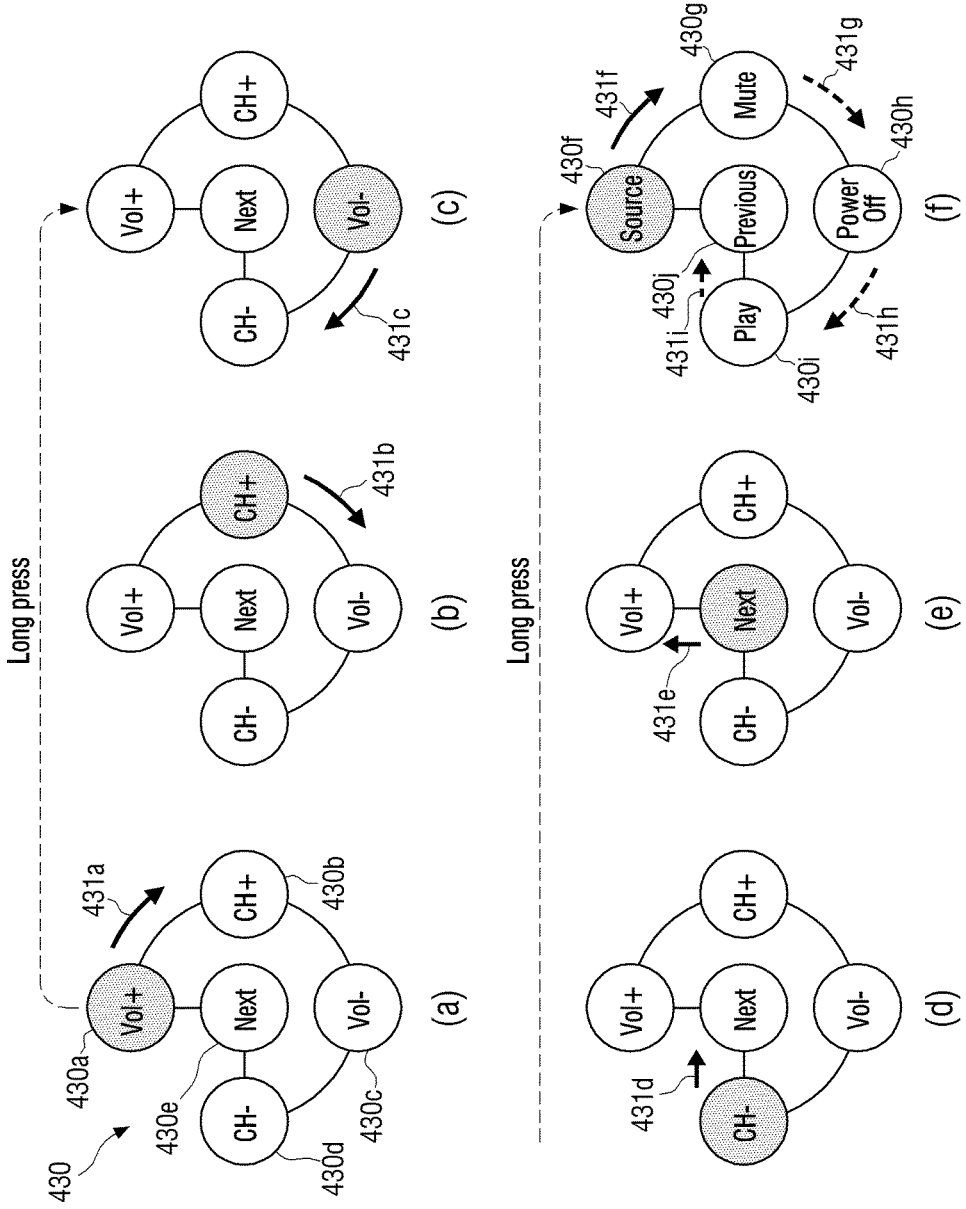

Referring to FIGS. 4D and 4E, the user may perform a third input 403 re-selecting the first button 261f of the second remote controller 200. In the present specification, an operation of re-selecting the first button by the user is called the third input 403. The user may long press the first button 261f in order to select one of a plurality of items 430a to 430i in the second screen 430. In the case in which an item (for example, 430f) positioned later depending on a sequence of the plurality of items 430a to 430i is selected, a long press time for selecting the first button 261f may be increased. One long press or a plurality of long presses of the first button 261f for selecting one of the plurality of items 430a to 430i may be called the third input 403.

The controller 210 of the second remote controller 200 may store 'item selection information of the second screen' corresponding to the re-selection of the first button 261f for selecting one of the plurality of items 430a to 430i in the second screen 430 in the storage 280. The item selection information of the second screen stored for managing a history may include an item selection information identifier (ID) of the second screen, a first button name, a first button re-selection time, a first button selection duration time corresponding to the long press, or the like.

The controller 210 may generate the third control information using the item selection information of the second screen. The controller 210 may generate the third control information using the item selection information of the second screen and the remote control data format. In addition, the controller 210 may load or select the third control information stored in the storage 280 using the item selection information of the second screen. The controller 210 may load or select the third control information stored in the storage 280 using the third button re-selection information and the remote control data format.

The third control information may be substantially similar to the first control information (for example, they have a difference in a sequence there between). A waveform of the third control information may be substantially the same as that of the first control information.

In another exemplary embodiment of the present disclosure, in the case in which the waveform of the first control information and the waveform of the second control information are the same as each other and the third control information having a waveform different from that of the first control information is received, the controller 110 may control the first electronic apparatus 100 as if the waveform of the third control information was the same as that of the first control information. For example, in S370 of FIG. 3, the item of the second screen 430 may be selected regardless of whether the waveform of the received third control information is the same as or different from that of the first control information that has been already received.

Similar to FIGS. 4B and 5, the controller 210 may transmit the third control information corresponding to the long press of the first button 261*f* to the first electronic apparatus 100. The controller 210 may periodically transmit the third control information to the first electronic apparatus 100 through the light output 250. The controller 210 may transmit the second control information to the first electronic apparatus 100 for a set time.

In the long press of the first button 261*f* is released by the user, the controller 210 may stop transmitting the third control information to the first electronic apparatus 100 depending on the release of the long press of the first button 261*f*.

In the case in which the long press selecting the first button 261*f* is released by the user, the controller 210 may stop transmitting the third control information through the light output 250.

Since the reception of the third control information in S370 of FIG. 3 is substantially similar to the reception of the first control information in S320 of FIG. 3, an overlapped description will be omitted.

The first electronic apparatus 100 receives the third control information output from the second remote controller 200 through the light receiver 150. The light receiver 150 of the first electronic apparatus 100 may receive the third control information output from the second remote controller 200 by a control of the sub-processor (not illustrated) (or the controller). The received third control information may be stored in the storage 180 by a control of the controller 110.

In S380 of FIG. 3, an operation of the first electronic apparatus is controlled depending on the third control information.

Figure 7:
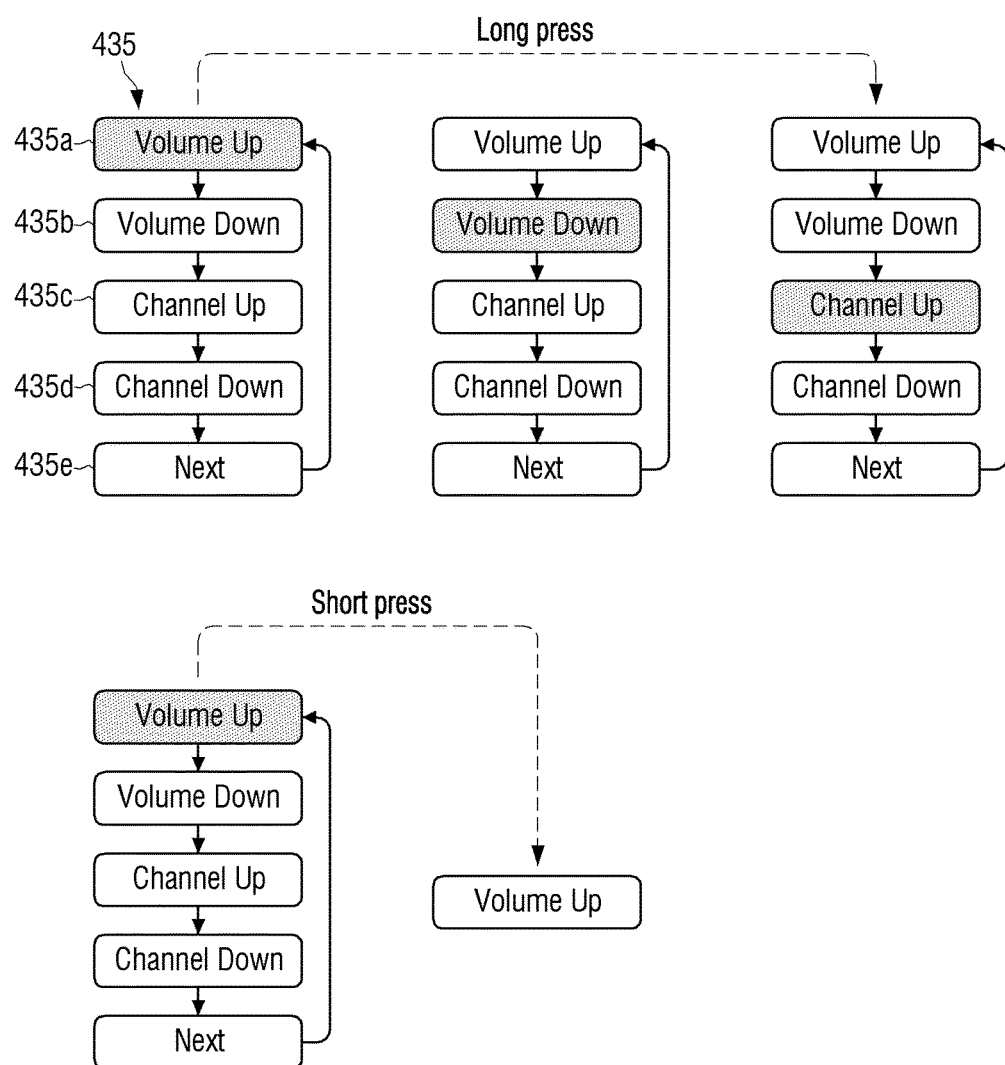
FIG. 7 is a schematic view illustrating an example of a second screen according to another exemplary embodiment of the present disclosure.

FIG. 7 is a schematic view illustrating an example of a second screen according to another exemplary embodiment of the present disclosure.

Figure 8:
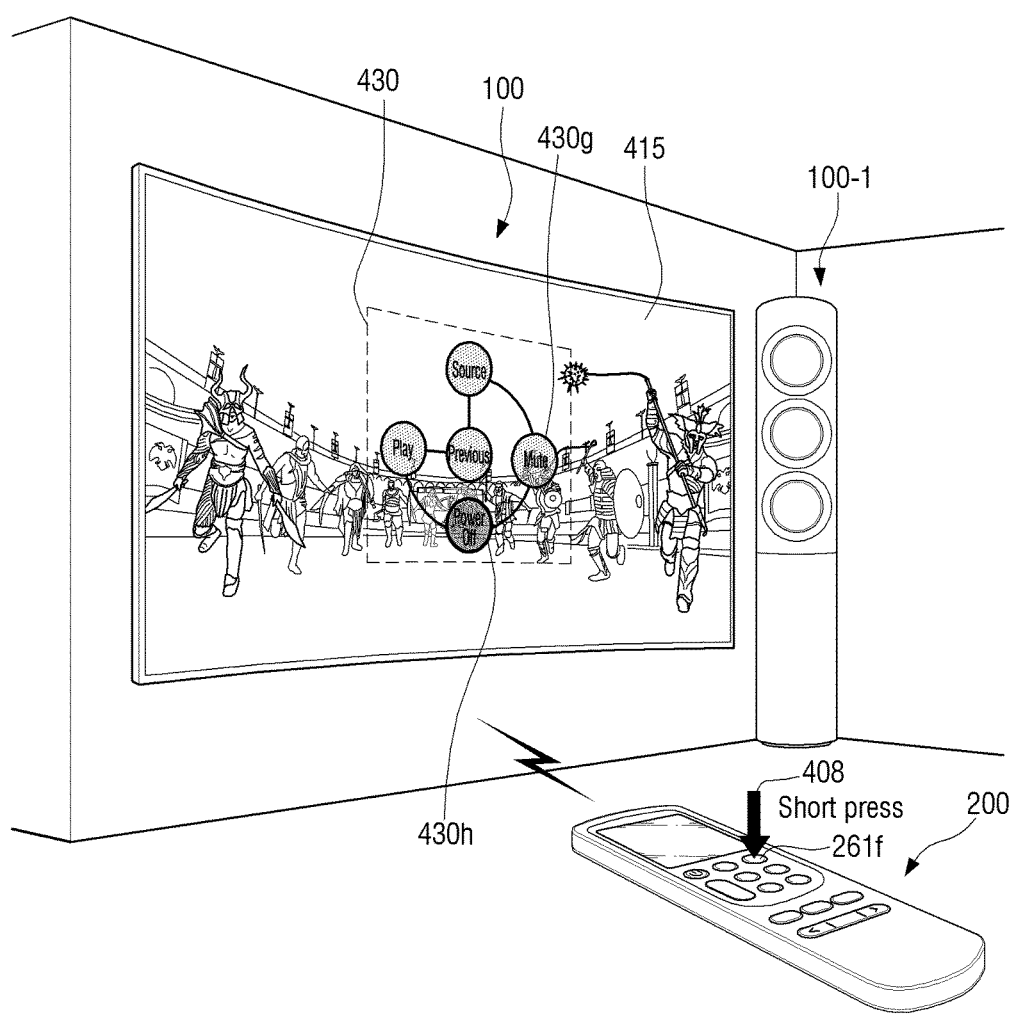
FIG. 8 is a schematic view illustrating an example of a second screen corresponding to power-off of an electronic apparatus according to another exemplary embodiment of the present disclosure.

FIG. 8 is a schematic view illustrating an example of a second screen corresponding to power-off of an electronic apparatus according to another exemplary embodiment of the present disclosure.

Figure 4F:
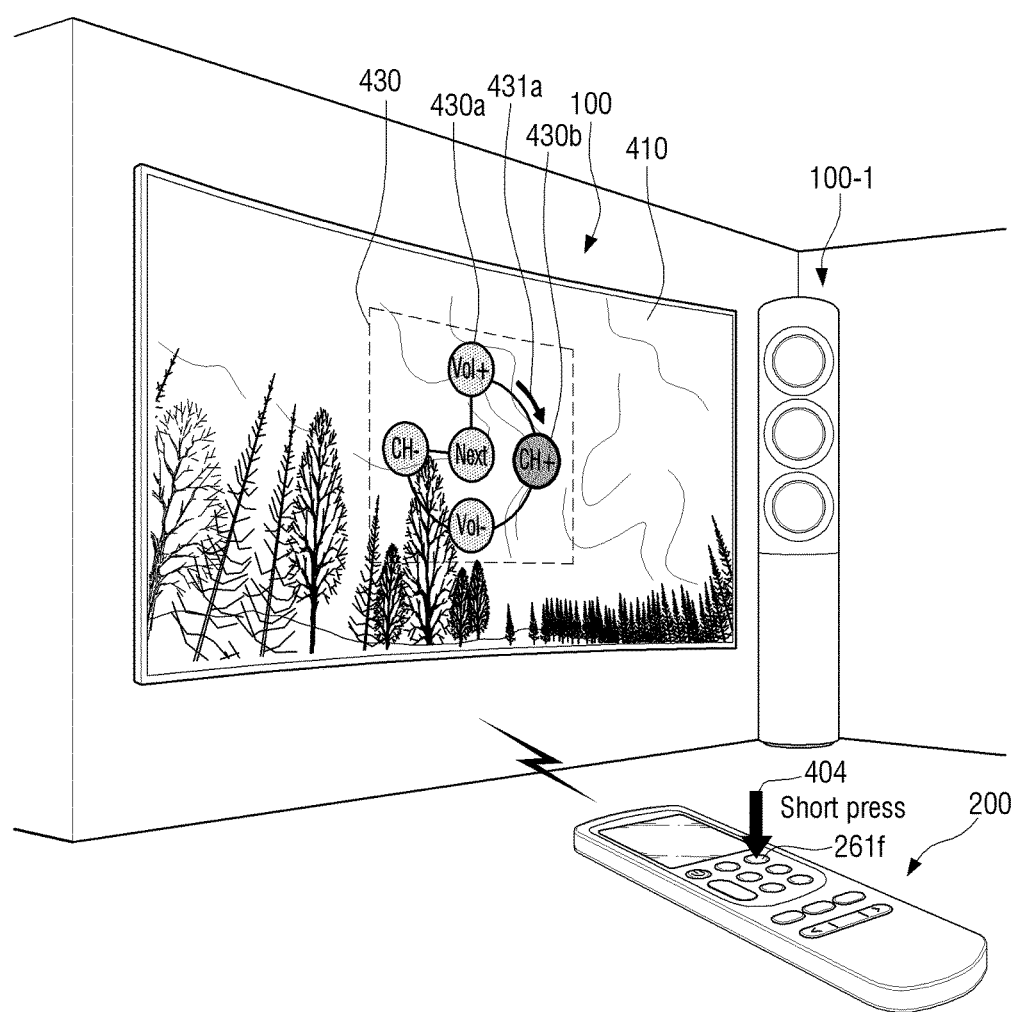

Referring to FIGS. 4E and 4F, in the case in which the third control information is received from the second remote controller 200, the controller 110 may control an UI indicating an item to be selected among a plurality of items 430*a* to 430*i* of the second screen, which is the circular UI displayed on the display 170, to move between the items 430*a* to 430*i* of the second screen 430.

The movement of the UI indicating the item to be selected among the plurality of items 430*a* to 430*i* in the second screen 430, which is the circular UI, between the items 430*a* to 430*i* may be performed by a time of the long press of the first button 261*f*. In the case in which the third control information is received from the second remote controller, the controller 110 may control the UI indicating the item to be selected to move between the items 430*a* to 430*i* of the second screen 430, which is the circular UI, depending on a reception time of the third control information.

The controller 110 may control the display to display guides (for example, arrows 431*a* to 431*j*) depending on the movement of the UI indicating the item to be selected among the plurality of items 430*a* to 430*i* in the second screen 430, between the plurality of items 430*a* to 430*i*, by the reception of the third control information from the second remote controller. The controller 110 may control the display to display the guides 431*a* to 431*j* adjacently to the items 430*a* to 430*i* depending on the movement of the UI indicating the item to be selected between the plurality of items 430*a* to 430*i* in the second screen 430, by the reception of the third control information from the second remote controller.

The guides 431*a* to 431*j* displayed adjacently to the plurality of items 430*a* to 430*i* may include a text, an image, or a symbol indicating a movement direction of the UI indicating the item to be selected.

The controller 110 may control the display to sequentially display the guides 431 (for example, 431*a* to 431*j*) depending on the movement of the UI indicating the item to be selected between the plurality of items 430*a* to 430*i*. For example, in the case in which the UI indicating the item to be selected moves from a volume-up 430*a*, which is one of the plurality of items 430*a* to 430*i*, to a channel-up 430*b*, the controller 110 may control the display to display one 431*a* of the guides 431*a* to 431*j*.

In the case in which the movement of the UI indicating the item to be selected between the volume-up 430*a*, which is one of the plurality of items 430*a* to 430*i*, and the channel-up 430*b* is completed, the controller 110 may control the display not to display one 431*a* of the guides 431*a* to 431*j* any more.

Referring to FIG. 7, in the case in which the third control information is received from the second remote controller, the controller 110 may control a UI indicating an item to be selected among a plurality of items 435*a* to 435*e* of the second screen 435, which is the uni-directional UI as another form displayed on the display 170, to move between the plurality of items 435*a* to 435*e*.

The movement of the UI indicating the item to be selected, between the plurality of items 435*a* to 435*e* in the second screen 435, which is the uni-directional UI, may be performed by a time of the long press of the first button 261*f*, similar to the movement of the UI indicating the item to be selected, between the plurality of items 430*a* to 430*i* of the second screen 430, which is the circular UI. In the case in which the third control information is received from the second remote controller, the controller 110 may control the UI indicating the item to be selected to move between the plurality of items 435*a* to 435*e* in the second screen 435, which is the uni-directional UI, depending on a reception time of the third control information.

The controller 110 may control the display to display guides (for example, arrows (not illustrated)), similar to the second screen 430, which is the circular UI, depending on the movement of the UI indicating the item to be selected between the items 435*a* to 435*e* in the second screen 435 by the reception of the third control information from the second remote controller.

Since the movement of the UI indicating the item to be selected between the plurality of items 435*a* to 435*e* in the second screen 435, which is the uni-directional UI, and stop of the movement are substantially similar (is different in only a UI from) to the movement of the UI indicating the item to be selected between the plurality of items 430*a* to 430*i* in the second screen 430, which is the circular UI, and stop of the movement, an overlapped description will be omitted.

Since the display of the guides (not illustrated) in the second screen 435, which is the uni-directional UI, is substantially similar (is different in only a UI from) to the display of the guides 431 in the second screen 430, which is the circular UI, an overlapped description will be omitted.

Referring to FIG. 4F, the user performs a fourth input 404 re-selecting the first button 261*f* in the channel-up 430*b* of the plurality of items of the displayed second screen 430.

The user may short press the first button 261f for executing an item (for example, the channel-up 430b) of the second screen 430.

The controller 210 of the second remote controller 200 may store 'item selection information of the second screen' corresponding to the re-selection of the first button 261f for executing the item (for example, the channel-up 430b) of the second screen 430 in the storage 280. The item selection information of the second screen stored for managing a history may include an item selection information identifier (ID) of the second screen, a first button name, a first button re-selection time, the number of times of a short press of the first button, a first button re-selection duration time corresponding to the short press, or the like. The item (for example, the channel-up 430b) of the second screen 430 selected by the long press may be changed (for example, a broadcasting channel number may be increased) depending on the number of times of the short press of the first button 261f.

The controller 210 may generate the fourth control information using the item selection information of the second screen. The controller 210 may generate the fourth control information using the item selection information of the second screen and the remote control data format. In addition, the controller 210 may load or select the fourth control information stored in the storage 280 using the item selection information of the second screen. The controller 210 may load or select the fourth control information stored in the storage 280 using the stored item selection information of the second screen or the remote control data format.

The fourth control information may be substantially similar to the first control information (for example, they have a difference in a sequence there between). A waveform of the fourth control information may be substantially the same as that of the first control information.

Similar to FIGS. 4B and 5, the controller 210 may transmit the fourth control information corresponding to the short press of the first button 261f to the first electronic apparatus 100. The controller 210 may periodically transmit the fourth control information to the first electronic apparatus 100 through the light output 250. The controller 210 may transmit the fourth control information to the first electronic apparatus 100 for a set time.

In the short press of the first button 261f is released by the user, the controller 210 may stop transmitting the fourth control information to the first electronic apparatus 100 depending on the release of the short press of the first button 261f.

In the case in which the short press of the first button 261f is released by the user, the controller 210 may stop transmitting the fourth control information through the light output 250.

Since the reception of the fourth control information in S370 of FIG. 3 is substantially similar to the reception of the first control information in S320 of FIG. 3, an overlapped description will be omitted.

The first electronic apparatus 100 receives the fourth control information output from the second remote controller 200 through the light receiver 150. The light receiver 150 of the first electronic apparatus 100 may receive the fourth control information output from the second remote controller 200 by a control of the sub-processor (not illustrated) (or the controller). The received fourth control information may be stored in the storage 180 by a control of the controller 110.

Figure 4G:
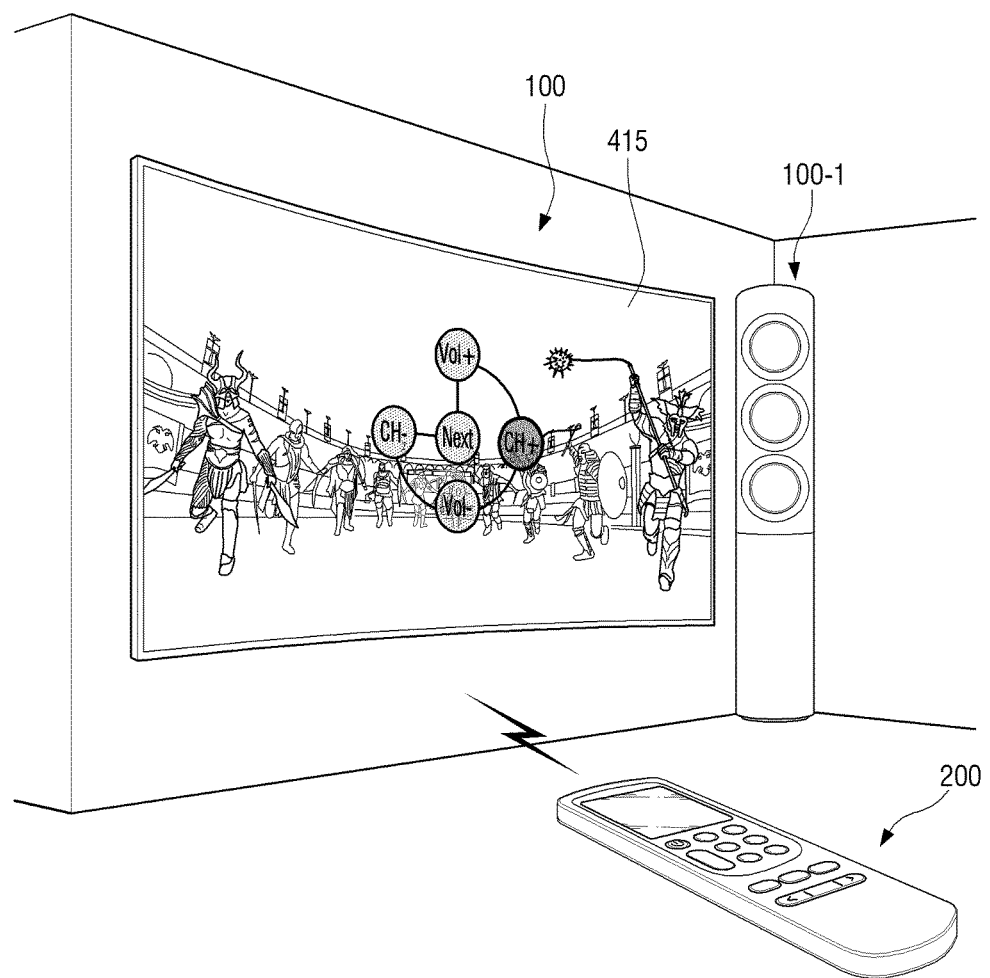

Referring to FIG. 4G, in the case in which the fourth control information is received from the second remote controller 200, the controller 110 may change the content 410 displayed on the display 170 into another content 415 (for example, broadcasting channel No. 101) and display another content 415. The content 415 may be a broadcasting channel number different from broadcasting channel No. 100 of the content 410.

In the case in which the fourth control information is received from the second remote controller 200, the controller 110 may change a broadcasting channel (for example, increase a broadcasting channel number), which is the selected item (for example, the channel-up 430b), depending on the number of times of the short press of the first button 261f. For example, in the case in which the number of times of the short press of the first button 261f in the received fourth control information is 1, the controller 110 may change a current broadcasting channel number (for example, broadcasting channel No. 100) into another broadcasting channel number (for example, broadcasting channel No. 101). In addition, in the case in which the number of times of the short press of the first button 261f in the continuously received fourth control information is 1 (a total number of times of the short press of the first button 261f is 2), the controller 110 may change a current broadcasting channel number (for example, broadcasting channel No. 101) into another broadcasting channel number (for example, broadcasting channel No. 102).

In the case in which an item different from the channel-up 430b of the plurality of items 430a to 430i of the second screen 430 is selected, the controller 110 may perform a change (for example, volume-up, or the like) depending on the reception of the fourth control information from the second remote controller.

In an exemplary embodiment of the present disclosure, the control information received from the second remote controller 200 may be one of control information corresponding to the selection of the first button 261f of the second remote controller 200 by the long press of the first button 261f and control information corresponding to the selection of the first button 261f of the second remote controller 200 by the short press of the first button 261f.

In the case in which the first control information, the second control information, and the third control information are control information corresponding to the long press of the first button 261f in the second remote controller 200, the fourth control information may be control information corresponding to the short press of the first button 261f in the second remote controller 200. In addition, in the case in which the first control information, the second control information, and the third control information are control information corresponding to the short press of the first button 261f in the second remote controller 200, the fourth control information may be control information corresponding to the long press of the first button 261f in the second remote controller 200.

Referring to FIG. 8, the user performs an eighth input 408 re-selecting the first button 261f in a power-off 430g selected among the items of the displayed second screen 430. The user may short press the first button 261f for executing the item (for example, the power-off 430g) of the second screen 430.

Since the short press of the first button 261f corresponding to the power-off 430g in FIG. 8 is substantially similar to the short press of the first button 261f corresponding to the channel-up 430b of FIG. 4F (for example, there is a difference between items), an overlapped description will be omitted.

In the case in which the fourth control information is received from the second remote controller 200, the controller 110 may execute the selected item (the power-off 430g) depending on the received fourth control information.

The short press of the first button 261f for the selected power-off 430g in the second screen 430 may be substantially the same as a selection of a power button 261a' of the first remote controller 200a that is lost (or malfunctions).

In S380 of FIG. 3, in the case in which the operation of the first electronic apparatus is controlled depending on the third control information, the method for controlling an electronic apparatus ends.

The control signals from the remote control may be sent and received by other than a transmitter and a light receiver. For example, a radio wave transmitter and receiver may be used.

Methods according to exemplary embodiments of the present disclosure may be implemented in a form of program commands that may be executed through various computer means and may be recorded in a non-transitory computer-readable recording medium. The computer-readable recording medium may include a program command, a data file, a data structure or the like, alone or a combination thereof. For example, the computer-readable recording medium may include a volatile or non-volatile storage such as a read only memory (ROM), a memory such as a random access memory (RAM), a memory chip, a device, or an integrated circuit, or a storage medium optically or magnetically readable and readable by a machine (for example, a computer), such as a compact disk (CD), a digital versatile disk (DVD), a magnetic disk, a magnetic tape, or the like, regardless of whether data are erasable or rewritable. It may be appropriated that a memory that may be included in a mobile terminal is an example of a storage medium appropriate for storing a program or programs including instructions implementing exemplary embodiments of the present disclosure and readable by a machine. The program commands recorded in the computer-readable recording medium may be especially designed and configured for the present disclosure or be known to those skilled in a field of computer software.

Although the present disclosure has been described with reference to the exemplary embodiments and the accompanying drawings, the present disclosure is not limited to the above-mentioned exemplary embodiments, but may be variously modified and changed from the above description by those skilled in the art to which the present disclosure pertains.

Therefore, the scope of the present disclosure is not construed as being limited to the exemplary embodiments described above, but should be defined by the following claims as well as equivalents thereto.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An electronic apparatus controllable by another remote controller dedicated to remotely control another electronic apparatus, comprising:
   a storage;
   a display;
   a light receiver for receiving remote control information from the another remote controller for remotely controlling another electronic apparatus; and
   a processor configured to:
   receive first control information from the another remote controller through the light receiver, the first control information being control information for controlling the another electronic apparatus;
   based on a remote control data format corresponding to the received first control information being different from a remote control data format corresponding to the remote controller stored in the storage and the received first control information not being analyzed by the electronic apparatus, control the display to display a first screen using the received first control information;
   receive second control information from the another remote controller through the light receiver while the first screen is displayed, the second control information being control information for controlling the another electronic apparatus; and
   based on the first control information being same as the second control information, control the display to display a second screen including a plurality of control items for controlling the electronic apparatus.

2. The electronic apparatus as claimed in claim 1, wherein the processor controls an operation of the electronic apparatus depending on a selected control item in the second screen in response to third control information corresponding to a selection of one of the plurality of control items received from the another remote controller.

3. The electronic apparatus as claimed in claim 2, wherein the first control information, the second control information, and the third control information are signals each transmitted by a selection of a same button positioned of the another remote controller and having a same waveform.

4. The electronic apparatus as claimed in claim 2, wherein the third control information is a signal corresponding to a selection of one button that is long pressed on the another remote controller where a long press is a button press longer that a period between leader codes of the another remote controller.

5. The electronic apparatus as claimed in claim 4, wherein the plurality of control items are one of arranged in a circular shape and arranged uni-directionally, and
   when the third control information corresponding to the long press is received, the processor controls a user interface (UI) indicating an item to be selected among the plurality of control items to move between the plurality of control items depending on a time period of the long press.

6. The electronic apparatus as claimed in claim 5, wherein the processor controls the display to display guides corresponding to a movement of the UI indicating the item to be selected adjacent the plurality of control items.

7. The electronic apparatus as claimed in claim 2, wherein when fourth control information is additionally received from the another remote controller, the processor performs a control where one of the plurality of items selected by the third control information is executed by the fourth control information.

8. The electronic apparatus as claimed in claim 7, wherein the fourth control information is a signal corresponding to a selection of one button short pressed in the another remote controller where a short press is a button press shorter that a period between leader codes of the another remote controller.

9. The electronic apparatus as claimed in claim 7, wherein when a power-off corresponding to one of the plurality of items is selected by the third control information and the fourth control information is received from the another remote controller, the controller controls the electronic apparatus to power off.

10. The electronic apparatus as claimed in claim 1, wherein when the first control information is received for at least a set time period, the processor supplies power to the display.

11. The electronic apparatus as claimed in claim 1, wherein the processor includes a main processor and a sub-processor, and
when the first control information is received for at least a first set time period, the sub-processor supplies power to the display.

12. The electronic apparatus as claimed in claim 1, wherein when the first screen is displayed on the display and the second control information is not received for a set time period, the processor controls the display to power off.

13. The electronic apparatus as claimed in claim 1, wherein the plurality of control items in the second screen are one of arranged in a circular shape and arranged unidirectionally.

14. The electronic apparatus as claimed in claim 1, wherein the processor controls the display the plurality of control items of the second screen in a same form by a second remote controller transmitting control information to the electronic apparatus.

15. The electronic apparatus as claimed in claim 1, wherein the plurality of control items of the second screen are changed depending on a type of the electronic apparatus.

16. The electronic apparatus as claimed in claim 1, wherein the first screen includes information to inform a user that the first remote controller is not being used.

17. The electronic apparatus as claimed in claim 16, wherein the processor stores power off information including information about a last used remote controller to power off the electronic apparatus in the storage and based on the stored power off information, the processor controls the display to the first screen including the information regarding the remote controller.

18. A method for controlling an electronic apparatus using another remote controller dedicated to remotely control another electronic apparatus, the method comprising:
receiving, by the electronic apparatus, first control information from the another remote controller, the first control information being control information for remotely controlling the another electronic apparatus;
based on a remote control data format corresponding to the received first control information being different from a remote control data format corresponding to the remote controller stored in a storage of the electronic apparatus and the received first control information not being analyzed by the electronic apparatus, displaying, by the electronic apparatus, a first screen on a display of the electronic apparatus using the first control information;
receiving, by the electronic apparatus, second control information from the another remote controller through a light receiver of the electronic apparatus while the first screen is displayed, the second control information being control information for controlling the another electronic apparatus; and
based on the first control information being same as the second control information, displaying, by the electronic apparatus, a second screen on the display including a plurality of control items for controlling the electronic apparatus.

19. The method for controlling the electronic apparatus as claimed in claim 18, further comprising:
displaying, by the electronic apparatus, a selected control item on the second screen depending on third control information received from the another remote controller depending on a selection of one of the plurality of control items; and
executing, by the electronic apparatus, an operation of the electronic apparatus corresponding to the selected control item in the second screen depending on fourth control information received from the another remote controller,
wherein the first control information, the second control information, and the third control information are signals each transmitted by a selection of a same button positioned in the another remote controller and having a same waveform.

20. The method for controlling the electronic apparatus as claimed in claim 19, wherein the first control information, the second control information, and the third control information are control information corresponding to a long press of the same button in the another remote controller, where the long press is a button press longer that a period between leader codes of the another remote controller and the fourth control information is control information corresponding to a short press of the same button in the another remote controller where a short press is a button press shorter that the period between the leader codes of the another remote controller.

* * * * *

UNITED STATES PATENT AND TRADEMARK OFFICE
CERTIFICATE OF CORRECTION

PATENT NO. : 10,720,047 B2  
APPLICATION NO. : 15/349500  
DATED : July 21, 2020  
INVENTOR(S) : Jin-hyuk Hong et al.

Page 1 of 1

It is certified that error appears in the above-identified patent and that said Letters Patent is hereby corrected as shown below:

On the Title Page

Item [56] (References Cited), under Other Publications, Line 1:  
Delete "Rrandomly" and insert -- Randomly --, therefor.

Item [57] (Abstract), Line 5 (approx.):  
Before "embodiments" delete "y".

In the Claims

Column 34, Line 36 (approx.):  
In Claim 4, after "longer" delete "that" and insert -- than --, therefor.

Column 34, Line 60 (approx.):  
In Claim 8, after "shorter" delete "that" and insert -- than --, therefor.

Column 35, Line 23:  
In Claim 14, after "display" add "to display".

Column 35, Line 32:  
In Claim 16, before "remote" delete "first".

Column 35, Line 38:  
In Claim 17, after "to" add "display".

Column 36, Line 41:  
In Claim 20, after "longer" delete "that" and insert -- than --, therefor.

Column 36, Line 45:  
In Claim 20, after "shorter" delete "that" and insert -- than --, therefor.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*